United States Patent [19]
Nomura

[11] Patent Number: 5,661,570
[45] Date of Patent: Aug. 26, 1997

[54] IMAGE-DATA PROCESSING APPARATUS

[75] Inventor: Mayumi Nomura, Yokkaichi, Japan

[73] Assignee: Brother Kogyo Kabushiki Kaisha, Aichi-ken, Japan

[21] Appl. No.: 506,567

[22] Filed: Jul. 25, 1995

[30] Foreign Application Priority Data

Jul. 27, 1994 [JP] Japan ................... 6-175311

[51] Int. Cl.$^6$ ................................ H04N 1/405
[52] U.S. Cl. .............. 358/456; 358/465; 358/466
[58] Field of Search ................. 358/456, 457, 358/458, 466, 534, 535, 536, 298; 382/237, 270

[56] References Cited

U.S. PATENT DOCUMENTS

| | | |
|---|---|---|
| 4,680,645 | 7/1987 | Dispoto et al. . |
| 5,045,952 | 9/1991 | Eschbach ................. 358/466 |
| 5,086,484 | 2/1992 | Katayama et al. ........ 382/270 |
| 5,268,774 | 12/1993 | Eschbach ................. 358/466 |
| 5,402,245 | 3/1995 | Motta et al. . |
| 5,553,166 | 9/1996 | Kakutani ................. 382/270 |

OTHER PUBLICATIONS

"An Adaptive Algorithm for Spatial Grey Scale" (Floyd et al.), *SID 75 Digest*, Stanford University, Stanford, CA.

"A Survey of Techniques for the Display of Continuous Tone Pictures on Bilevel Displays", (Jarvis et al.), *Computer Graphics and Image Processing* 5 (1976), pp. 13–40.

*Primary Examiner*—Scott A. Rogers
*Attorney, Agent, or Firm*—Oliff & Berridge

[57] ABSTRACT

An apparatus for processing multilevel image data representing a half-tone image, into bilevel image data representing a bilevel image corresponding to the half-tone image, the multilevel image data including sets of multilevel pixel data each set of which represents one of three or more color values as a first color value indicating a color of a corresponding one of pixels of the half-tone image, and is processed into a corresponding one of sets of bilevel pixel data of the bilevel image data so that the corresponding one set of bilevel pixel data represents one of two color values as a second color value indicating a color of a corresponding one of pixels of the bilevel image, the apparatus including a data processing device for processing each set of multilevel pixel data into a corresponding one set of bilevel pixel data, by an error diffusion process wherein an error value occurring in processing each set of multilevel pixel data into a corresponding one set of bilevel pixel data is distributed to one or more first pixels which neighbor the corresponding one pixel of the half-tone image and correspond to one or more sets of multilevel pixel data yet to be processed, the processing device processing each set of multilevel pixel data into a corresponding one set of bilevel pixel data, by employing a threshold value which is variable depending upon the each set of multilevel pixel data.

42 Claims, 14 Drawing Sheets

|   |   | * | $\frac{7}{48}$ e | $\frac{5}{48}$ e |
|---|---|---|---|---|
| $\frac{3}{48}$ e | $\frac{5}{48}$ e | $\frac{7}{48}$ e | $\frac{5}{48}$ e | $\frac{3}{48}$ e |
| $\frac{1}{48}$ e | $\frac{3}{48}$ e | $\frac{5}{48}$ e | $\frac{3}{48}$ e | $\frac{1}{48}$ e |

FIG. 2

IMAGE-DATA PROCESSING APPARATUS

BACKGROUND OF THE INVENTION

1. Field of the Invention

The present invention relates to an image-data processing apparatus and in particular to such a processing apparatus which processes multilevel image data representing a continuous-tone or half-tone image, into bilevel image data representing a bilevel image corresponding to the half-tone image.

2. Related Art Statement

There is known a digital electrophotographic copier or a thermal or ink-jet printer which has an image-data processing device.

In conventional image-data processing devices, there have widely been used various sorts of dither processes such as a systematic dither process wherein multilevel image data are processed into bilevel image data by using a threshold table or matrix (i.e., dither matrix). However, in those processes, a larger matrix is needed to obtain a higher reproducibility of the half-tone image; and a smaller matrix is needed to obtain a higher resolution of the bilevel image. Thus, the two requirements are not compatible with each other.

There is known an error diffusion process wherein a higher reproducibility of a half-tone image and a higher resolution of a bilevel image are compatible with each other. The error diffusion process has been regarded relatively well in the conventional image-data processing methods.

Hereinafter, a known error diffusion process is described by reference to FIGS. 13 to 15 and FIG. 2.

FIG. 13 shows a conventional image-data processing device which carries out an error diffusion process; FIG. 14 shows a flow chart representing a control program according to which the device of FIG. 13 operates for processing multilevel image data into bilevel image data; and FIG. 15 shows a bilevel image output by an output device (e.g., a recorder or a display, not shown) of the device of FIG. 13. In the error diffusion process, the same weighing-coefficient matrix as shown in FIG. 2 is used by the device of FIG. 13.

In the following description relating to the prior art device of FIG. 13, it is assumed that a batch of multilevel image data representing a half-tone image consists of a number of sets of multilevel pixel data each of which can take one of 0 to 255 integral values, is processed into a corresponding one of a number of sets of bilevel pixel data of a batch of bilevel image data representing a bilevel image corresponding to the half-tone image. Each set of bilevel pixel data can take one of 0 and 255 values. Each set of bilevel pixel data may be modified into a modified set of bilevel pixel data which can take one of 0 and 1 values which correspond to the initial 0 and 255 values, respectively.

The prior art apparatus of FIG. 13 includes an input image data storing device or first memory 102 which stores, as input digital image data, multilevel image data representing an original continuous- or half-tone image. The apparatus further includes a random access memory (RAM) 103 which operates as a working register or data buffer, a read only memory (ROM) 104, and a central processing unit (CPU) 105 which reads the multilevel image data from the first memory 102 and processes the multilevel image data into bilevel image data representing a bilevel image corresponding to the original half-tone image, according to a control program pre-stored in the ROM 104, by utilizing a temporary-storage function of the RAM 103. The RAM 103, ROM 104, and CPU 105 cooperate with each other to provide a data processing device which processes multilevel image data into bilevel image data by an error diffusion process. The conventional apparatus further includes an output image data storing device or second memory 106 which stores the bilevel image data produced by the data processing device 103, 104, 105.

The ROM 104 stores a weighing-coefficient matrix, shown in FIG. 2, which is used in the error diffusion process. A symbol, e, indicates an error value which occurs in processing each set of multilevel pixel data of a batch of multilevel image data, into a corresponding one set of bilevel pixel data of a batch of bilevel image data. A batch of multilevel image data consists of a number of sets of multilevel pixel data each set of which represents one of 256 color values (i.e., integral numbers of 0 to 255) as an input color value indicating a color of a corresponding one (indicated at symbol, *, in FIG. 2) of a number of pixels (i.e., picture elements) of an original half-tone image, and which is processed into a corresponding one of a number of sets of bilevel pixel data of a batch of bilevel image data so that the corresponding one set of bilevel pixel data represents one of two color values (i.e., integral numbers of 0 and 255) as an output color value indicating a color of a corresponding one of a number of pixels of a bilevel image. The error value e is divided into twelve error values according to the respective weighing coefficients of the matrix, and the thus obtained twelve weighed error values are distributed to twelve first pixels which neighbor the current pixel indicated at symbol * and correspond to twelve sets of multilevel pixel data yet to be processed by the data processing device 103, 104, 105.

The ROM 104 also stores a fixed threshold, $T_{fix}$, which is compared with a corrected input color value, I', (described later) in the error diffusion process.

The image-data processing apparatus of FIG. 13 operates according to the control program pre-stored in the ROM 104 and represented by the flow chart of FIG. 14. First, at Step S101, the CPU 15 reads, from the first memory 102, the first set of multilevel pixel data of the multilevel image data stored therein which represents an input color value, I, indicating the color of the left top pixel of the original half-tone image represented by the multilevel image data. Step S101 is followed by Step S102 to read the fixed threshold $T_{fix}$ from the ROM 104. The threshold $T_{fix}$ is not changed or replaced with any other value, i.e., constant for all the input color values I. Generally, the fixed threshold $T_{fix}$ is selected at a median value of an input-color-value range within which the parameter I is variable. Since each set of multilevel pixel data can take one of 0 to 255 integral values, the threshold $T_{fix}$ is fixed at 128.

Step S102 is followed by Step S103 to read, from the RAM 103, a sum, E, of respective weighed error values distributed, according to the matrix shown in FIG. 2, to the current pixel indicated at symbol *, from neighboring sixteen pixels which have already been processed. The sum E is added to the input color value I of the current pixel to determine a corrected input color value, I', which is compared with the fixed threshold $T_{fix}$ at Step S104.

If the corrected first value I' satisfies the following expression: $I' \geq T_{fix}$, that is, if the input value I and the sum E satisfy the following expression: I+E≧128, the CPU 105 determines, at Step S105, an output color value, O=255, indicating the color of a corresponding pixel of the bilevel image, and produces a set of bilevel pixel data representing the output value O=255. On the other hand, if the corrected first value I' does not satisfy the expression: I'≥$T_{fix}$, that is, if the input value I and the sum E do not satisfy the expression: I+E≥128, the CPU 105 determines, at Step S106, an output color value, O=0, indicating the color of a corresponding pixel of the bilevel image, and produces a set of bilevel pixel data representing the output value O=0.

At Step S107, the CPU 105 writes, in the second memory 106, a modified set of bilevel pixel data representing a value, 1, corresponding to the output color value O=255, or a modified set of bilevel pixel data representing a value, 0, corresponding to the output value O=0.

At the following step S108, an error value, e, is obtained based on the corrected input color value I' and the output color value O, according the following expression: e=I'−O. At Step S109, the weighing-coefficient matrix of FIG. 2 is read from the ROM 104. The matrix defines an error-value weighing and distributing rule according to which the error value, e (=I'−O), obtained at Step S108 is divided into twelve weighed error values and the twelve weighed error values are distributed to twelve neighboring pixels yet to be processed, respectively, at Step S110. Then, the control of the CPU 105 proceeds with the next pixel, i.e., the set of multilevel pixel data representing the input color value of the next pixel.

The error value e occurring in processing the current pixel indicated at symbol * in FIG. 2 is multiplied by each of the twelve weighing coefficients of the matrix and is distributed to a corresponding neighboring pixel. The RAM 103 includes a data buffer which accumulatively stores, as the sum E, respective weighed error values distributed to each pixel from twelve neighboring pixels which have been processed using the matrix of FIG. 2.

The above operation is repeated with respect to each set of multilevel pixel data of the multilevel image data.

However, the conventional error diffusion process suffers from the following problem:

The input color values represented by the sets of multilevel pixel data for the pixels around an edge or edges of the half-tone image change largely and sharply. However, the sum E of the weighed error values distributed to each pixel cannot influence the result of comparison of the corrected input value I' (=I+E) with the fixed threshold $T_{fix}$, until the absolute value of the sum E increases up to the difference between the input value I and the fixed threshold $T_{fix}$. Consequently the recording or displaying of the pixels of the bilevel image is biased in the directions of distribution of the error values e.

SUMMARY OF THE INVENTION

It is therefore an object of the present invention to provide an image-data processing apparatus which processes multilevel image data into bilevel image data free from the problem that the outputting of a bilevel image represented by the bilevel image data is biased in the direction or directions of distribution of the error values occurring in processing the multilevel image data into the bilevel image data.

The above object may be achieved according to a first aspect of the present invention, which provides an image-data processing apparatus for processing multilevel image data representing a half-tone image, into bilevel image data representing a bilevel image corresponding to the half-tone image, the multilevel image data comprising a number of sets of multilevel pixel data each set of which represents one of more than two color values as a first color value indicating a color of a corresponding one of a number of pixels of the half-tone image, and is processed into a corresponding one of a number of sets of bilevel pixel data of the bilevel image data so that the corresponding one set of bilevel pixel data represents one of two color values as a second color value indicating a color of a corresponding one of a number of pixels of the bilevel image, the apparatus comprising: data obtaining means for obtaining the multilevel image data; and data processing means for processing the each set of multilevel pixel data into the corresponding one set of bilevel pixel data, by an error diffusion process wherein an error value occurring in processing the each set of multilevel pixel data into the corresponding one set of bilevel pixel data is distributed to at least one first pixel which neighbors the corresponding one pixel of the half-tone image and corresponds to at least one set of multilevel pixel data yet to be processed by the data processing means, the data processing means processing the each set of multilevel pixel data into the corresponding one set of bilevel pixel data, by employing a threshold value which is variable depending upon the each set of multilevel pixel data. The bilevel image may be presented as an image consisting of first pixels recorded in a color and second pixels not recorded in any color (i.e., "background" pixels with a color of, e.g., a recording sheet or a raster), or an image consisting of first pixels recorded in a first color and second pixels recorded in a second color different from the first color. A "color" of each pixel of the half-tone or bilevel image may be a chromatic color, or an achromatic Color such as a gray color. A first color value represented by each set of multilevel pixel data of the multilevel image data may be said as a gray scale value, and a second color value represented by each set of bilevel pixel data of the bilevel image data may be said as a binary value.

In the image-data processing apparatus in accordance with the first aspect of the invention, the processing of the multilevel image data into the bilevel image data by the error diffusion process may be performed so that the sum of the respective error values distributed to each pixel more quickly influences the result of comparison of the first color value of that pixel with the variable threshold value. Therefore, the bilevel image data are free from the conventionally encountered problem that the outputting of the bilevel image represented by the bilevel image data is biased in the direction or directions of distribution of the error values, in particular around an edge or edges where the first color values of the multilevel pixels of the half-tone image change so largely and sharply. Thus, the bilevel image data may be utilized by an output device such as a recorder or a display to present, to an observer, an excellent bilevel image free from the problem of biasing of the bilevel pixels around an edge or edges of the bilevel image.

In a preferred embodiment in accordance with the first aspect of the invention, the image-data processing apparatus further comprises an output device which presents the bilevel image to an observer corresponding to the bilevel image data produced by the data processing means. The output device may comprise a recorder which records, on a recording medium, the bilevel image represented by the bilevel image data. The recorder may be a copier or a printer. Alternatively, the output device may comprise a display which includes an image screen and displays, on the screen, the bilevel image represented by the bilevel image data. The display may be a cathode ray tube (CRT) or a liquid crystal display (LCD).

In another embodiment in accordance with the first aspect of the invention, the data obtaining means comprises an image pick-up device which picks up an original image from an original and produces the multilevel image data representing the original image as the half-tone image. The image pick-up device may be a television (TV) camera or an image scanner. The image pick-up device may include a pick-up head which is movable relative to the original to pick up the original image from the original.

In another embodiment in accordance with the first aspect of the invention, the data obtaining means comprises a receiving device which receives the multilevel image data from an external data storage device. The external data storage device may be a floppy disk or a random access memory (RAM) card.

In another embodiment in accordance with the first aspect of the invention, the image-data processing apparatus further comprises an internal data storage device in which the multilevel image data are stored, the data obtaining means comprising means for reading the multilevel image data from the internal data storage device.

In another embodiment in accordance with the first aspect of the invention, the data processing means comprises: correcting means for correcting the first color value of the each set of multilevel pixel data, based on a sum of the respective error values distributed by the data processing means to the corresponding one pixel of the half-tone image from a plurality of second pixels which neighbor the corresponding one pixel of the half-tone image and correspond to a plurality of sets of multilevel pixel data which have been processed by the data processing means; and producing means for producing the corresponding one set of bilevel pixel data representing the one of the two color values as the second color value, by comparing the corrected first color value with the variable threshold value.

In another embodiment in accordance with the first aspect of the invention, the data processing means comprises error determining means for determining the error value based on the corrected first color value and the second color value, i.e., based on the first color value, the sum of the respective error values distributed from the second pixels, and the second color value.

In another embodiment in accordance with the first aspect of the invention, the data processing means comprises error distributing means for distributing the error value to the first neighboring pixels. The error distributing means may comprise means for dividing the error value into a plurality of weighed values according to a predetermined weighing rule and distributing the weighed values to the first neighboring pixels, respectively, according to a predetermined distributing rule. The weighing and distributing rules may be defined by, e.g., a weighing-coefficient matrix as shown in FIG. 2.

In another embodiment in accordance with the first aspect of the invention, the data processing means comprises threshold determining means for determining the variable threshold value based on the each set of multilevel pixel data. The threshold determining means may comprise means for determining the variable threshold value, $T_{var}$, according to a following expression:

$$T_{var} = a \times I + b$$

where I is the first color value of the each set of multilevel pixel data, and a and b are predetermined values, respectively.

In the case where each set of multilevel pixel data represents one of 256 values, from 0, 1, 2, . . . to 255, each set of data may be converted into a modified set of data representing one of every 8th values, 8, 16, 24, . . . to 255 before being processed into a corresponding set of bilevel pixel data. The constants a, b may be predetermined at appropriate values to process the modified sets of multilevel pixel data into the corresponding sets of bilevel pixel data. The threshold determining means may comprise means for determining the threshold value, $T_{var}$, according to a following expression:

$$T_{var} = n/2 + (I - n/2) \times A$$

where I is the first color value of the each set of multilevel pixel data, n is a number of the more than two color values, and A is an arbitrary coefficient satisfying $0 < A \leq 1$.

In particular, the coefficient A may be 1/2, for example.

In another embodiment in accordance with the first aspect of the invention, the data processing means comprises means for employing the variable threshold value when the first color value falls within a first range of the more than two color values, and employing, in place of the variable threshold value, a predetermined threshold value when the first color value falls within a second range of the more than two color values which does not overlap the first range.

According to a second aspect of the present invention, there is provided an image-data processing apparatus for processing multilevel image data representing a half-tone image, into bilevel image data representing a bilevel image corresponding to the half-tone image, the multilevel image data comprising a number of sets of multilevel pixel data each set of which represents one of more than two color values as a first color value indicating a color of a corresponding one of a number of pixels of the half-tone image, and is processed into a corresponding one of a number of sets of bilevel pixel data of the bilevel image data so that the corresponding one set of bilevel pixel data represents one of two color values as a second color value indicating a color of a corresponding one of a number of pixels of the bilevel image, the apparatus comprising: data obtaining means for obtaining the multilevel image data; and data processing means for processing the each set of multilevel pixel data into the corresponding one set of bilevel pixel data, by an error diffusion process wherein an error value occurring in processing the each set of multilevel pixel data into the corresponding one set of bilevel pixel data is distributed to at least one first pixel which neighbors the corresponding one pixel of the half-tone image and corresponds to at least one set of multilevel pixel data yet to be processed by the data processing means, the data processing means processing, according to a predetermined rule, the each set of multilevel pixel data into the corresponding one set of bilevel pixel data, by using a first-color-value correction value having an absolute value greater than an absolute value of a sum of at least one error value distributed thereby to the corresponding one pixel of the half-tone image from at least one second pixel which neighbors the corresponding one pixel of the half-tone image and which corresponds to at least one set of multilevel pixel data which has been processed by the data processing means. In the case where the single error value, or the sum of two or more error values, distributed to each multilevel pixel of the half-tone image has a positive sign, the first-color-value correction value is determined, according to a predetermined determining rule, to be greater than the single error value or the sum of error values; on the other hand, in the case where the single error value or the sum of error values has a negative sign, the first-color-value correction value is determined, according to the predetermined determining rule, to be smaller than the single error value or the sum of error values.

The image-data processing apparatus in accordance with the second aspect of the invention enjoys the same advantages as the above-described advantages of the image-data processing apparatus in accordance with the first aspect of the invention. In particular, the correction of the first color value by the first-color-value correction value may more quickly influence the result of comparison of the first color value, corrected with the correction value, with a predetermined threshold value.

In a preferred embodiment in accordance with the second aspect of the invention, the data processing means comprises: correcting means for correcting the first color value of the each set of multilevel pixel data, based on the correction value; and producing means for producing the corresponding one set of bilevel pixel data representing the one of the two color values as the second color value, by comparing the corrected first color value with a predetermined threshold value.

In another embodiment in accordance with the second aspect of the invention, the correcting means comprises means for correcting the first color value into the corrected first color value, I", according to a following expression:

$$I''=I+B\times E$$

where I is the first color value of the each set of multilevel pixel data,
E is the sum of the respective error values distributed from the second neighboring pixels, and
B is an arbitrary coefficient greater than one.

In particular, the coefficient B may be 2, for example.

In another embodiment in accordance with the second aspect of the invention, the data processing means comprises error determining means for determining the error value based on the first color value, the sum, and the second color value.

In another embodiment in accordance with the second aspect of the invention, the data processing means comprises error distributing means for distributing the error value to the first neighboring pixels. The error distributing means may comprise means for dividing the error value into a plurality of weighed values according to a predetermined weighing rule and distributing the weighed values to the first neighboring pixels, respectively, according to a predetermined distributing rule. The weighing and distributing rules may be defined by, e.g., a matrix as shown in FIG. 2.

In another embodiment in accordance with the second aspect of the invention, the data processing means comprises means for using the correction value when the first color value falls within a first range of the more than two color values, and using, in place of the correction value, the sum of the respective error values distributed from the second neighboring pixels, when the first color value falls within a second range of the more than two color values which does not overlap the first range.

According to a third aspect of the present invention, there is provided an image-data processing apparatus for processing multilevel image data representing a half-tone image, into bilevel image data representing a bilevel image corresponding to the half-tone image, the multilevel image data comprising a number of sets of multilevel pixel data each set of which represents one of more than two color values as a first color value indicating a color of a corresponding one of a number of pixels of the half-tone image, and is processed into a corresponding one of a number of sets of bilevel pixel data of the bilevel image data so that the corresponding one set of bilevel pixel data represents one of two color values as a second color value indicating a color of a corresponding one of a number of pixels of the bilevel image, the apparatus comprising: data obtaining means for obtaining the multilevel image data; and data processing means for processing the each set of multilevel pixel data into the corresponding one set of bilevel pixel data, by an error diffusion process wherein an error value occurring in processing the each set of multilevel pixel data into the corresponding one set of bilevel pixel data is distributed to at least one first pixel which neighbors the corresponding one pixel of the half-tone image and corresponds to at least one set of multilevel pixel data yet to be processed by the data processing means, the data processing means determining, according to a predetermined rule, the error value by using a first-color-value correction value having an absolute value smaller than an absolute value of a sum of at least one error value distributed thereby to the corresponding one pixel of the half-tone image from at least one second pixel which neighbors the corresponding one pixel of the half-tone image and which corresponds to at least one set of multilevel pixel data which has been processed by the data processing means. In the case where the single error value, or the sum of two or more error values, distributed to each multilevel pixel of the half-tone image has a positive sign, the first-color-value correction value is determined, according to a predetermined determining rule, to be greater than the single error value or the sum of error values; on the other hand, in the case where the single error value or the sum of error values has a negative sign, the first-color-value correction value is determined, according to the predetermined determining rule, to be smaller than the single error value or the sum of error values.

The image-data processing apparatus in accordance with the third aspect of the invention enjoys the same advantages as the above-described advantages of the image-data processing apparatus in accordance with the first or second aspect of the invention. In particular, the correction of the first color value by the first-color-value correction value may more quickly influence the result of comparison of the first color value, corrected with a different first-color-value correction value, with a predetermined threshold value.

In a preferred embodiment in accordance with the third aspect of the invention, the data processing means comprises error determining means for determining the error value, e', according to a following expression:

$$e'=c\times(x+E'/C-O)$$

where I is the first color value of the each set of multilevel pixel data,
O is the second color value of the corresponding one set of bilevel pixel data,
E' is the sum of the respective error values distributed from the second neighboring pixels, and
C is an arbitrary coefficient greater than one.

In particular, the coefficient C may be 2, for example. This expression may be generalized to $e'=f\times(I+(E'-g)/f-O)+g$ where f and g are predetermined values.

In another embodiment in accordance with the third aspect of the invention, the data processing means comprises error distributing means for dividing the error value into a plurality of weighed values according to a predetermined weighing rule and distributing the weighed values to the first neighboring pixels, respectively, according to a predetermined distributing rule. The weighing and distributing rules may be defined by, e.g., a matrix as shown in FIG. 2. The sum of the individual weighing coefficients of the matrix of FIG. 2 is equal to one. However, a matrix wherein the sum of individual weighing coefficients thereof may be equal to the above-indicated coefficient C. In the latter case, the data processing means may comprise error determining means for determining a different error value, e, according to a following expression: e=I+E/C−O.

In another embodiment in accordance with the third aspect of the invention, the data processing means comprises correcting means for correcting the first color value of the each set of multilevel pixel data, based on the sum of the respective error values distributed from the second neighboring pixels; and data producing means for producing the corresponding one set of bilevel pixel data representing the one of the two color values as the second color value, by comparing the corrected first color value with a predetermined threshold value.

In another embodiment in accordance with the third aspect of the invention, the correcting means comprises means for using the sum when the first color value falls within a first range of the more than two color values, and using, in place of the sum, the correction value when the first color value falls within a second range of the more than two color values which does not overlap the first range.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 2 is a view of a weighing-coefficient matrix used in an error diffusion process carried out by the apparatus of FIG. 1;

DETAILED DESCRIPTION OF THE PREFERRED EMBODIMENTS

Figure 1:
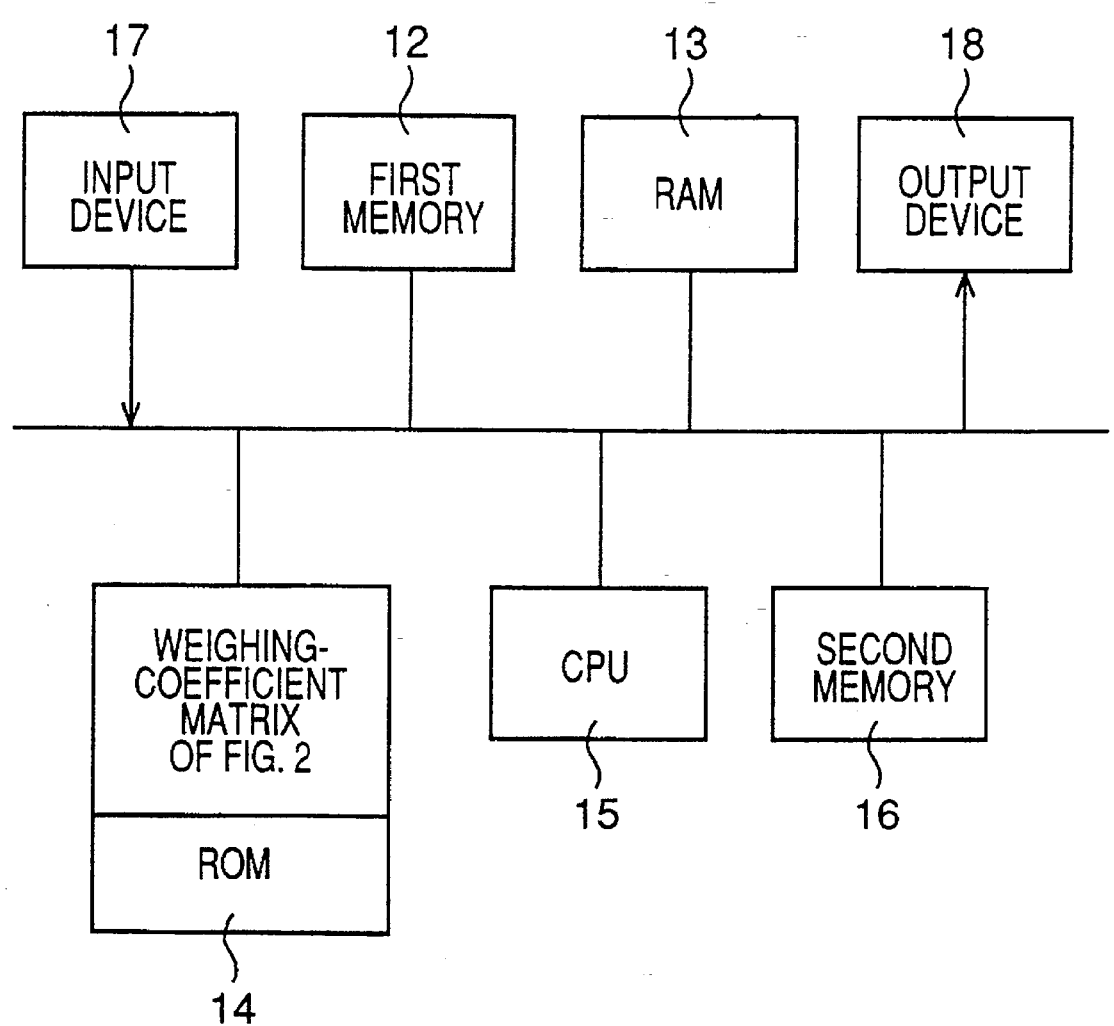
FIG. 1 is a block diagram of an image-data processing apparatus embodying the present invention.

Referring first to FIG. 1, there is shown an image-data processing apparatus embodying the present invention.

The processing apparatus includes an input image data storing device or first memory 12 which stores, as input digital image data, multilevel image data representing an original continuous- or half-tone image. The apparatus further includes a random access memory (RAM) 13 which operates as a working register or data buffer, a read only memory (ROM) 14, and a central processing unit (CPU) 15 which reads the multilevel image data from the first memory 12 and processes the multilevel image data into bilevel image data representing a bilevel image corresponding to the original half-tone image, according to a control program pre-stored in the ROM 14, by utilizing a temporary-storage function of the RAM 13. The RAM 13, ROM 14, and CPU 15 cooperate with each other to provide a data processing device which processes multilevel image data into bilevel image data by an error diffusion process (described later). The apparatus further includes an output image data storing device or second memory 16 which stores the bilevel image data produced by the data processing device 13, 14, 15.

An input device 17 and an output device 18 are connected to the data processing device 13, 14, 15. The input device 17 includes an image pick-up device such as an image scanner or reader which reads an original image from an original and produces multilevel image data representing the original image as a half-tone image, and/or a data reading device which reads multilevel image data from an external data storing device such as a floppy disk. The CPU 15 receives the multilevel image data from the input device 17, stores the received data in the first memory 12, and reads the stored data from the memory 12 to process the read data into bilevel image data. The output device 18 includes an image recording device such as a printer or a copier which records, on a recording medium such as a recording sheet, a bilevel image represented by the bilevel image data produced by the CPU 15, and/or an image displaying device such as a cathode ray tube or a liquid-crystal display which has an image screen and displays, on the screen, a bilevel image represented by the produced bilevel image data.

The ROM 14 stores a weighing-coefficient matrix, shown in FIG. 2, which is used in the error diffusion process. A symbol, e, indicates an error value which occurs in processing each set of multilevel pixel data of a batch of multilevel image data, into a corresponding one set of bilevel pixel data of a batch of bilevel image data. A batch of multilevel image data consists of a number of sets of multilevel pixel data each set of which represents one of 256 color values (i.e., integral numbers of 0 to 255) as an input color value indicating a color of a corresponding one (indicated at symbol, *, in FIG. 2) of a number of pixels of an original half-tone image, and which is processed into a corresponding one of a number of sets of bilevel pixel data of a batch of bilevel image data so that the corresponding one set of bilevel pixel data represents one of two color values (i.e., integral numbers of 0 and 255) as an output color value indicating a color of a corresponding one of a number of pixels of a bilevel image. The error value e is divided into twelve values according to the respective weighing coefficients of the matrix, and the thus obtained twelve weighed values are distributed to twelve pixels which neighbor the current pixel indicated at symbol * and correspond to twelve sets of multilevel pixel data yet to be processed.

Next, there will be described the operation of the image-data processing apparatus constructed as described above, by reference to the flow chart of FIG. 3. The processing apparatus processes multilevel image data into bilevel image data by an error diffusion process.

First, at Step S11, the CPU 15 reads, from the first memory 12, the first set of multilevel pixel data of the multilevel image data stored therein which represents an input color value, I, indicating the color of the left top pixel of the original half-tone image represented by the multilevel image data. Step S11 is followed by Step S12 to determine a threshold value, $T_{var}$, for the current pixel, based on the input color value I.

In the present embodiment, the variable threshold $T_{var}$ is determined according to the following expression (1)

$$T_{var}=n/2+(I-n/2)\times A \qquad (1)$$

where I is the input color value of each set of multilevel pixel data,
n is the number of the different integral values that can indicate the input color of each pixel, and
A is an arbitrary coefficient satisfying $0<A\leq 1$.

In the present embodiment, the number, n, is 256. In the case where the coefficient A is 1/2, the threshold $T_{var}$ is obtained according to the following expression (2):

$$T_{var}=128+(I-128)\times(1/2) \qquad (2)$$

The threshold $T_{var}$ obtained according to the expression (2) is variable within the range of from 64 to 191, depending upon the input color value I of the current pixel. For example, if the input value I is 152, the threshold $T_{var}$ is determined as 140 which is biased from the median value, 128, toward the maximum value, 191. Meanwhile, if the input value I is 104, the threshold $T_{var}$ is determined as 116 which is biased from the median value, 128, toward the minimum value, 64. In other words, in the case where the input value I of the current pixel is greater than the median value, the threshold $T_{var}$ is so determined as to be biased toward the maximum value and, in the case where the input value I is smaller than the median value, the threshold $T_{var}$ is so determined as to be biased toward the minimum value. In either case, the threshold $T_{var}$ for the current pixel is so determined as to be biased from the median value toward the input value I of that pixel.

The use of the variable threshold $T_{var}$ in place of a fixed threshold, $T_{fix}$, such as the median value, 128, provides the following advantages:

In the previously-described conventional error diffusion process, a fixed threshold, $T_{fix}=128$, is used. A corrected input color value, I' (=I+E), is obtained by adding, to the input color value, I, of the current pixel, a sum, E, of respective weighed error values which are distributed, according to the matrix of FIG. 2, to the current pixel from neighboring pixels which precede the current pixel in the order of processing of the multilevel image data and which have already been processed by the CPU 15. If the corrected first value I' satisfies the following expression: $I'\geq T_{fix}$, that is, the input value I and the sum E satisfy the following expression:

$$I+E\geq 128 \qquad (3)$$

the CPU 15 determines an output color value, O=255, indicating the color of a corresponding pixel of the bilevel image, and produces a set of bilevel pixel data representing the output value O=255.

In contrast thereto, in the present embodiment, the input color value I of the current pixel is corrected to a corrected input value, I', at Step S13, and the corrected first value I' is compared, at Step S14, with the variable threshold $T_{var}$, according to the following expression:

$$I'\geq T_{var}$$

If the left side of the above expression is replaced by (I+E) and the right side of the same is replaced by the expression (2), the following expression (4) results:

$$I+E\geq 128+(I-128)\times(1/2) \qquad (4)$$

If the left and right sides of the expression (4) is multiplied by 2, the following fifth expression (5) is obtained:

$$(I+E)\times 2\geq [128+(I-128)\times(1/2)]\times 2 \ (I+E)\times 2\geq [256+(I-128)] \ (I+E)\times 2\geq 128+I \ (I+E)\times 2-I\geq 128 \ I+E\times 2\geq 128 \qquad (5)$$

If the first color value I of the current pixel satisfies the above expression (5), the CPU 15 determines an output value, O=255, at Step S15; and, if not, the CPU 15 determines an output value, O=0, at Step S16.

As is known from the expressions (3) and (5), the difference between the comparison carried out using the fixed threshold $T_{fix}$ in the conventional error diffusion process and the comparison carried out using the variable threshold $T_{var}$ in the present embodiment is that the sum E is doubled in the comparison in accordance with the present embodiment. In the present embodiment, the threshold $T_{var}$ used in converting each set of multilevel pixel data into a corresponding set of bilevel pixel data is determined based on the input color value I represented by that set of multilevel pixel data, so that the threshold $T_{var}$ is biased toward that input value I. Consequently, in the error diffusion process in accordance with the present embodiment, the correction of the input value I by addition thereto of the sum E more quickly influences the determination of the output value O (=0 or 255) corresponding to the input value I (=0 to 255).

Figure 9:
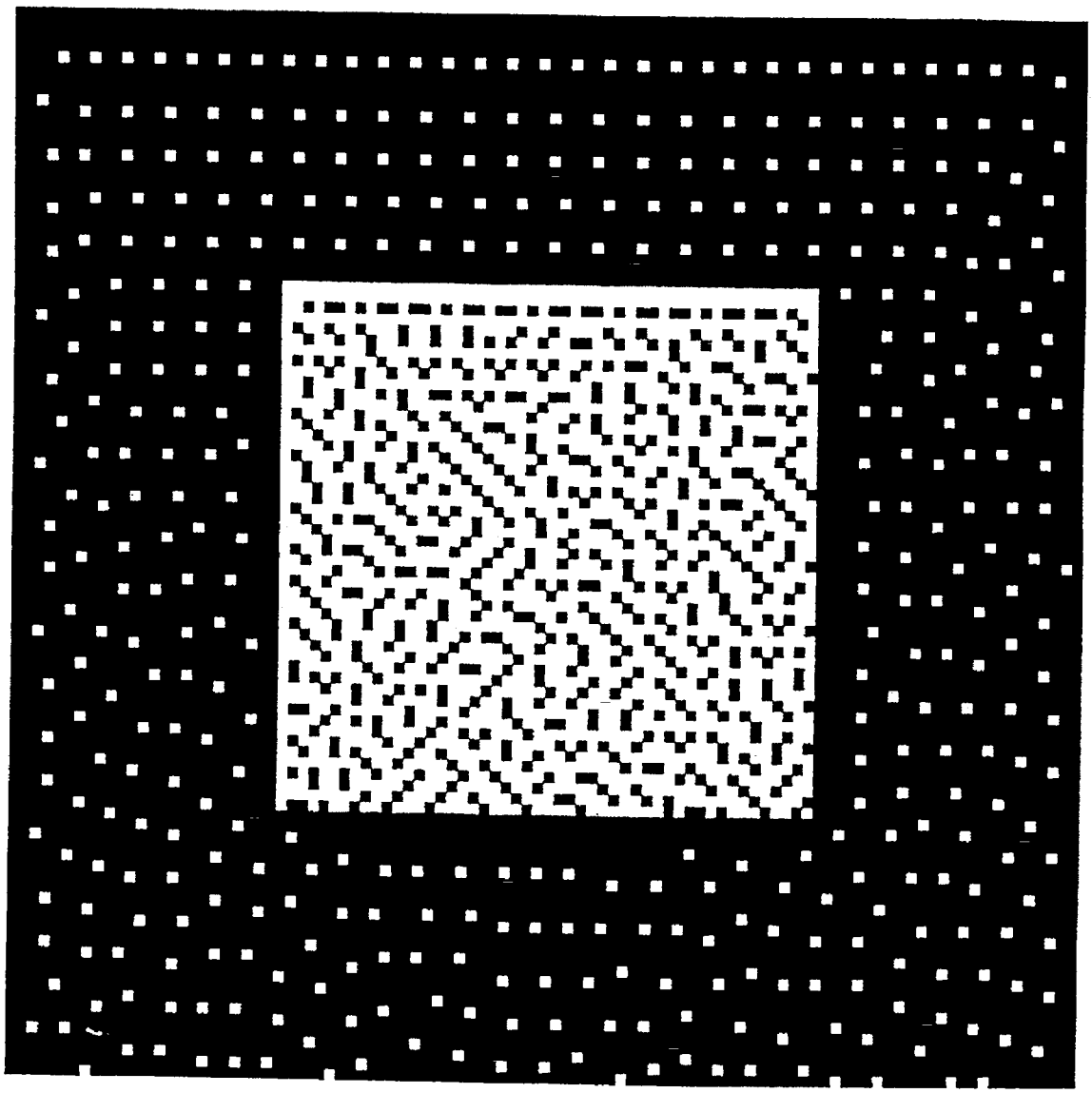
FIG. 9 is a view showing a bilevel image output by an output device of the apparatus of FIG. 1.
Figure 15:
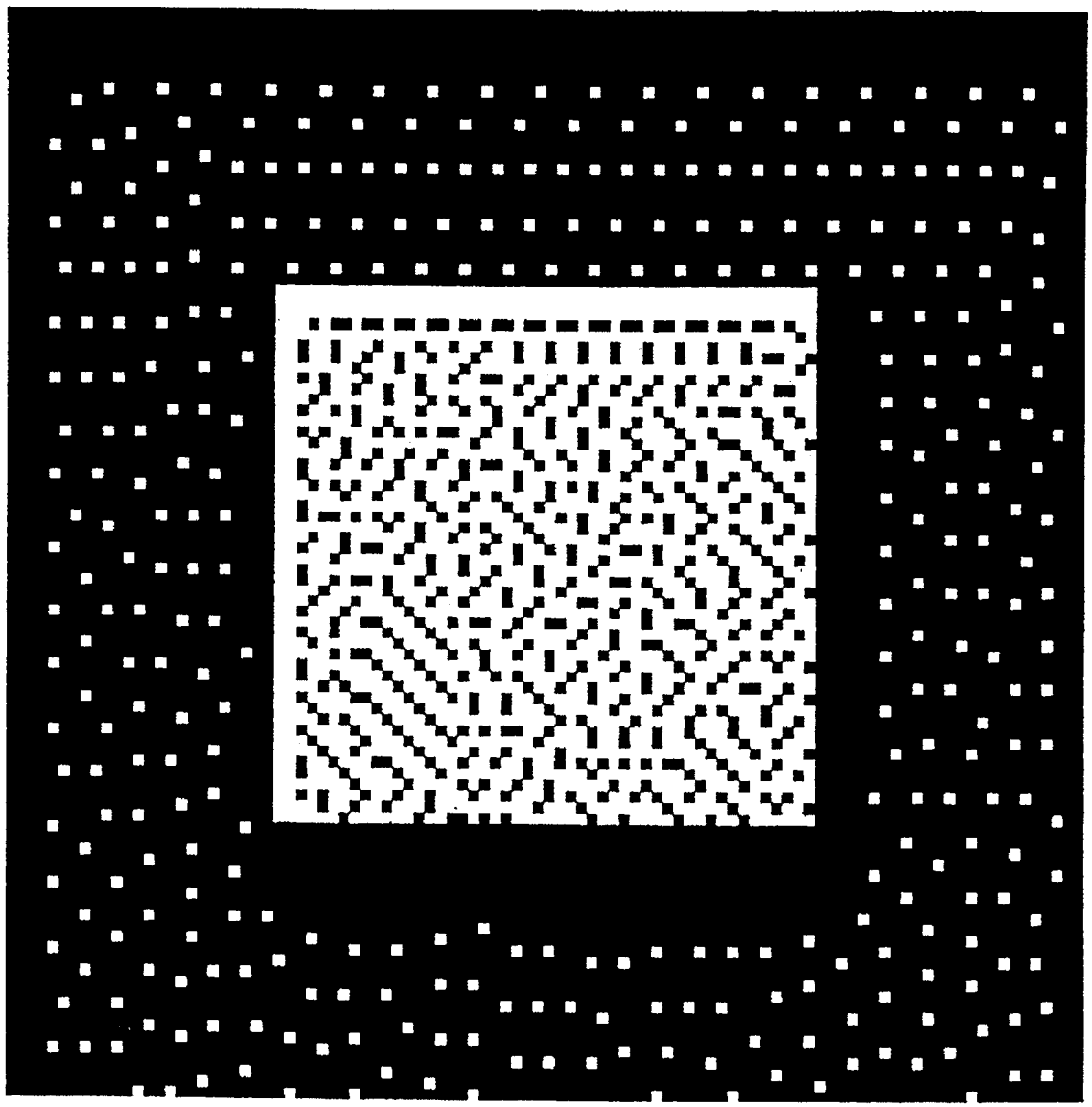
FIG. 15 is a view showing a bilevel image output by an output device of the prior art apparatus of FIG. 13.

In the case where the bilevel image data thus produced and stored in the second memory 16 at Step S17 are used to control the output device 18, such as a thermal printer or an ink-jet printer, so as to output a bilevel image represented by the bilevel image data, undesirable biasing of recording of the pixels around the edge or edges of the bilevel image, in the directions of processing of the multilevel image data from the left top corner pixel toward the right bottom pixel thereof is reduced, as shown in FIG. 9, as compared with the case where a bilevel image is produced based on bilevel image data produced by the conventional error diffusion process, as shown in FIG. 15. Thus, the output device 18 presents a more excellent bilevel image to an observer such as a user corresponding to the bilevel image data produced by the data processing device 13, 14, 15.

In the illustrated embodiment, the coefficient A occurring in the first expression (1) is selected at 1/2 which value is suitable for the weighing-coefficient matrix of FIG. 2, the coefficient A may be increased or decreased, as needed, so that the weight or ratio of the sum E relative to the input color value I is adjusted for appropriately determining the output color value O.

The matrix of FIG. 2 read from the ROM 14 at Step S19 defines an error-value weighing and distributing rule according to which an error value, e (=I'–O), obtained at Step S18, is divided into weighed error values and the weighed error values are distributed to neighboring pixels yet to be processed, respectively, at Step S20. However, the matrix of FIG. 2 may be replaced by other known matrixes, and appropriate coefficients A suitable for those matrixes may be experimentally determined. For example, the best coefficient A can be determined from the output results obtained by processing multilevel image data into bilevel image data while gradually changing the coefficient A.

In addition, the variable threshold $T_{var}$ may be determined according to the following, more generalized expression:

$$T_{var} = a \times I + b$$

where a and b are predetermined values, respectively.

In the present embodiment, Step S12 and a portion of the ROM 14 for storing the step cooperate with each other to provide threshold determining means for determining a threshold $T_{var}$ based on an input color value I of each pixel; Step S13 and a portion of the ROM 14 for storing the step cooperate with each other to provide correcting means for correcting the input color value I of each pixel into the corrected input color value I', based on the sum E of the respective error values distributed to that pixel from neighboring pixels which have already been processed; and Steps S14, S15, and S16 and a portion of the ROM 14 for storing those steps cooperate with each other to provide producing means for comparing the corrected first value I' and the threshold $T_{var}$ with each other and producing, based on the comparison result, a set of bilevel pixel data representing an output value O corresponding to the input value I. In the present embodiment, each set of bilevel pixel data represents zero, 0, corresponding to the output value O=0, or one, 1, corresponding to the output value O=255. Step S18 and a portion of the ROM 14 for storing the step cooperate with each other to provide error determining means for determining, based on the corrected input value I' and the output value O, an error value, e, occurring in processing each set of multilevel pixel data into a corresponding set of bilevel pixel data; and Steps S19 and S20 and a portion of the ROM 14 for storing those steps cooperate with each other to provide error distributing means for dividing the error value, e, into weighed error values according to the matrix of FIG. 2 and distributing the weighed error values to neighboring pixels yet to be processed, according to the same matrix.

Figure 3:
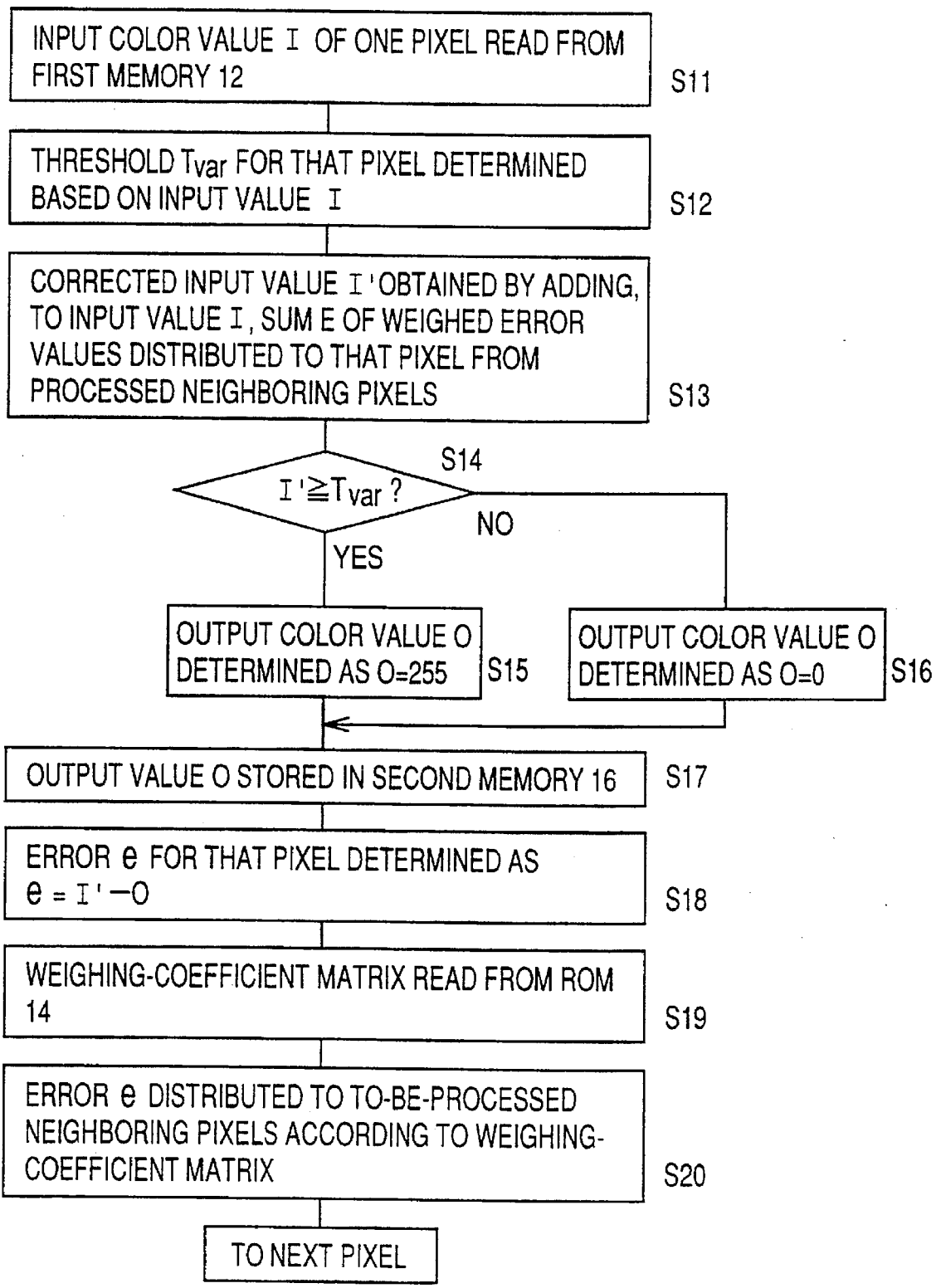
FIG. 3 is a flow chart representing a control program according to which the apparatus of FIG. 1 operates for processing multilevel image data into bilevel image data.
Figure 4:
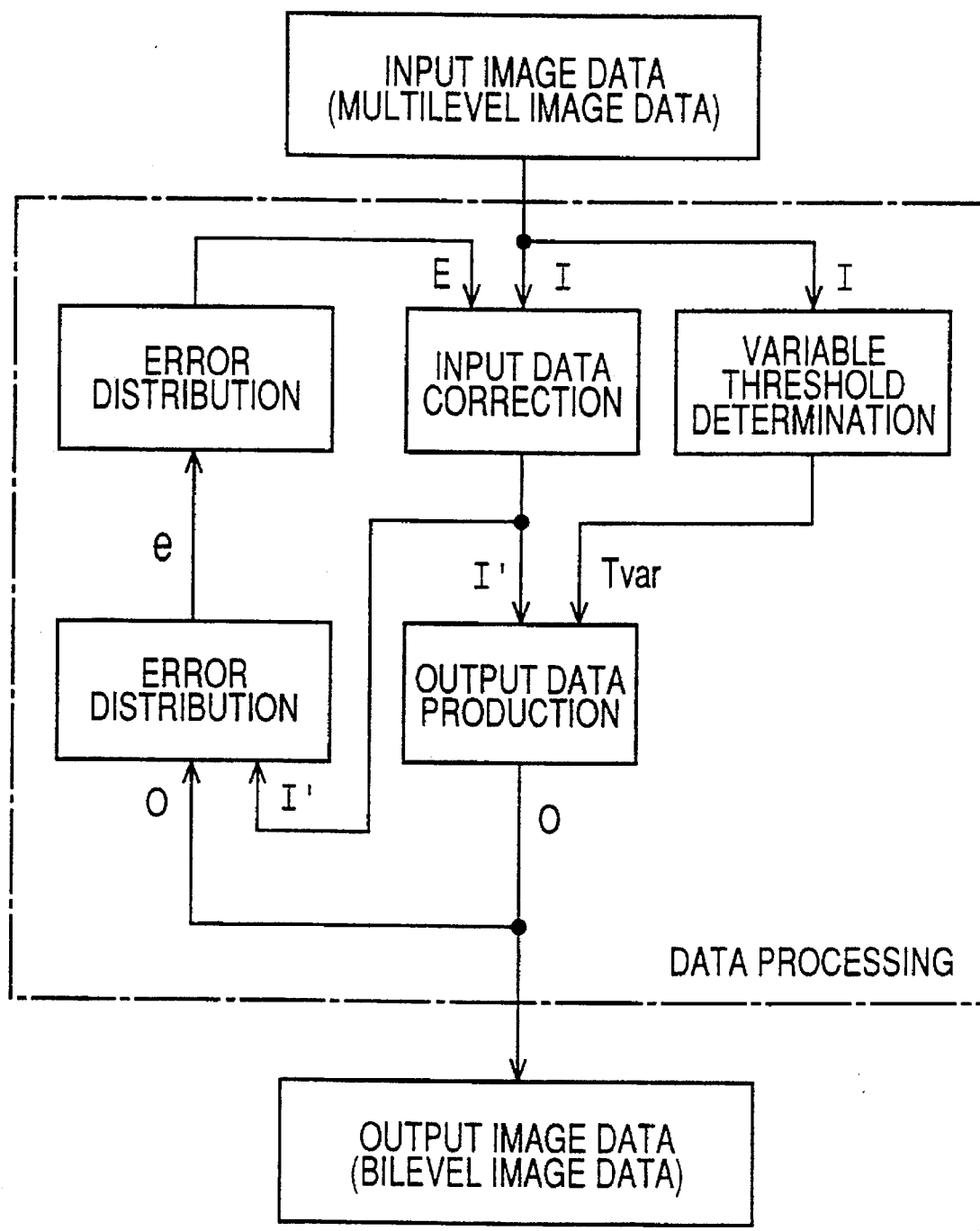
FIG. 4 is a diagrammatic view illustrating the operation of the apparatus of FIG. 1 in accordance with the control program represented by the flow chart of FIG. 3.

FIG. 4 diagrammatically shows the operation of the data processing apparatus of FIG. 1 according to the control program represented by the flow chart of FIG. 3.

Figure 5:
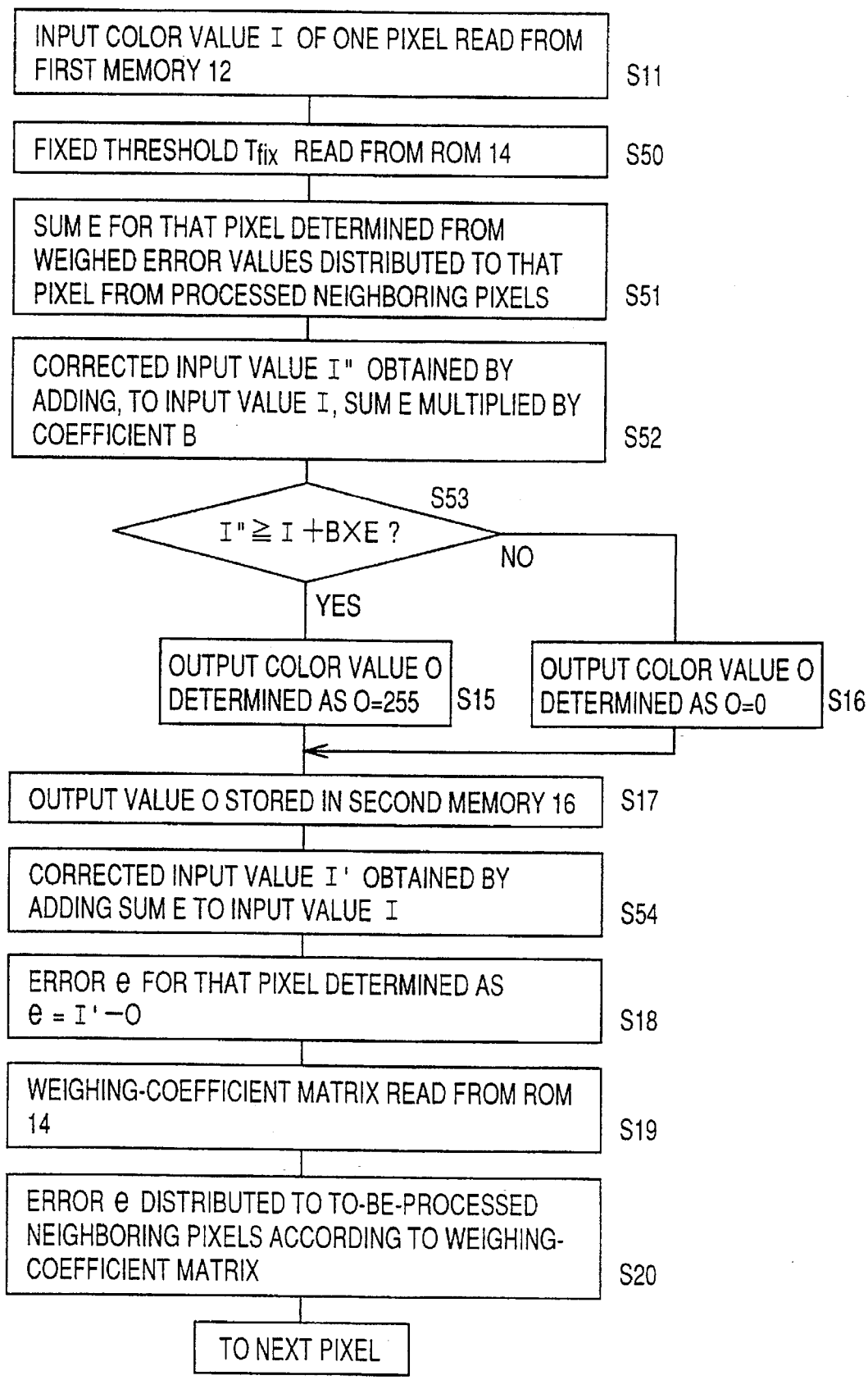
FIG. 5 is a flow chart representing another control program according to which the apparatus of FIG. 1 operates for processing multilevel image data into bilevel image data.
Figure 6:
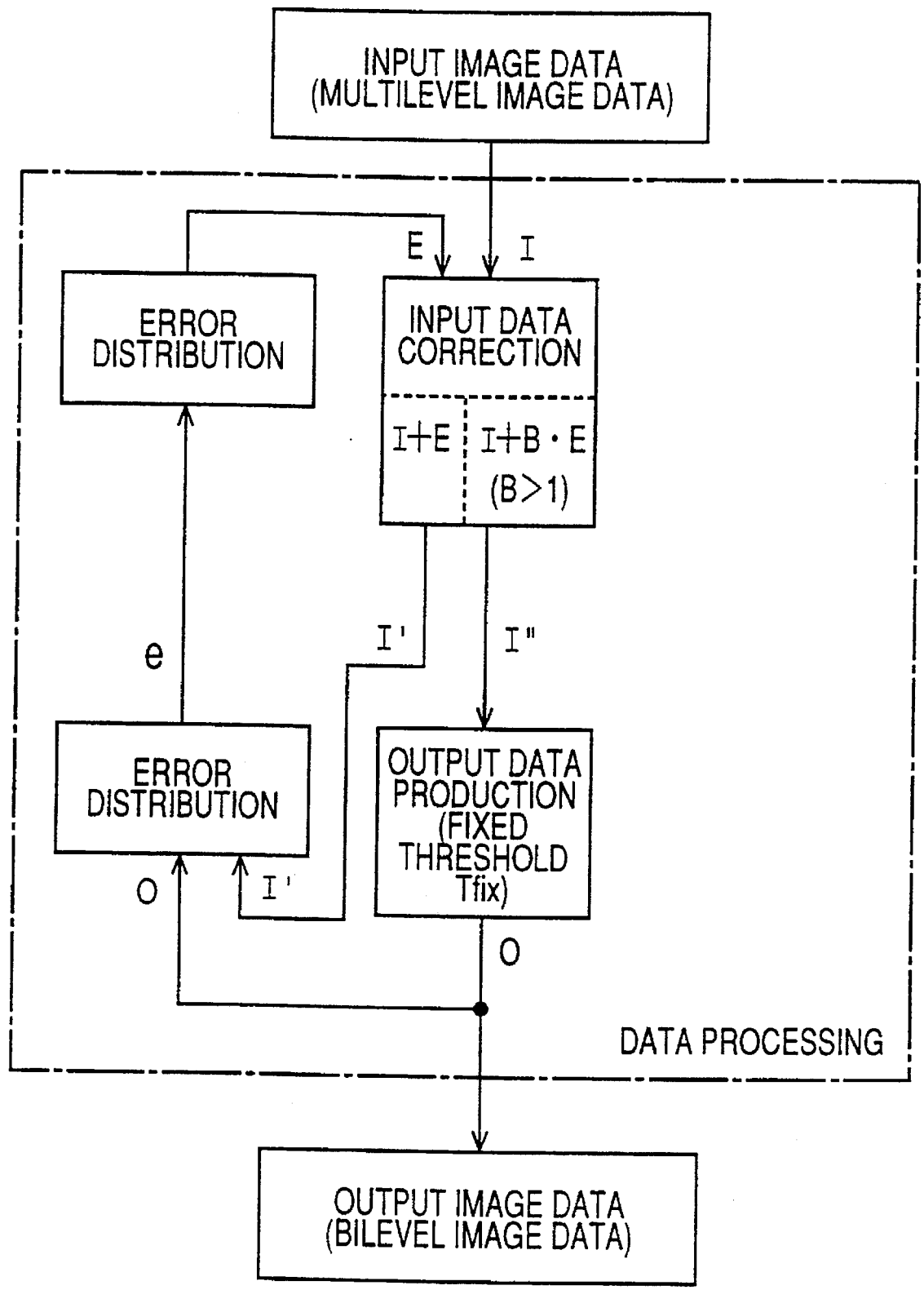
FIG. 6 is a diagrammatic view illustrating the operation of the apparatus of FIG. 1 in accordance with the control program represented by the flow chart of FIG. 5.

Referring next to FIGS. 5 and 6, there is illustrated a second embodiment of the present invention. The second embodiment relates to an image-data processing apparatus having a hardware construction similar to the apparatus shown in FIG. 1. However, in the second embodiment, a ROM 14 of the data processing apparatus stores a fixed threshold, $T_{fix}$=128, and a CPU 15 of the processing apparatus operates according to a control program represented by the flow chart of FIG. 5 in place of the control program represented by the flow chart of FIG. 3. The following description relates to only the differences between the first and second embodiments.

As is apparent from the previously-described expression (5), the same results as obtained by using the variable threshold $T_{var}$ defined by the expression (1) are obtained by correcting, at Step S52, an input color value, I, of each pixel to a corrected first value, I'', based on a sum, E, (read from a RAM 13 at Step S51) of respective error values distributed to that pixel from processed neighboring pixels, according to the following expression (6):

$$I'' = I + B \times E \qquad (6)$$

where I'' is the corrected first color value of each pixel, and

B is an arbitrary coefficient greater than one.

The corrected input value I'' is compared with the fixed threshold $T_{fix}$ read from the ROM 14, at Step S53.

In the case where a coefficient B=2 is used, the same expression as the expression (5) is obtained.

At Step S54, an error value, e, is determined, like in the first embodiment, by correcting the input value I to a different corrected first value, I'(=I+E), by adding the sum E to the first value I, and then subtracting an output value O from the corrected first value I'. The thus obtained error value, e, is divided and distributed according to, e.g., a matrix shown in FIG. 2. The corrected first value I' used for calculating the error value e is different from the corrected first value I'' used for the comparison with the threshold $T_{fix}$.

In the second embodiment, the CPU 15 determines the input-color-value correction value, B×E, having an absolute value greater than the absolute value of the sum E of the respective error values distributed to each pixel of the original half-tone image from neighboring pixels corresponding to sets of multilevel pixel data which have been processed by the data processing device 13, 14, 15. The present embodiment provides the same advantages as those with the first embodiment. For example, the present data processing apparatus can process, with higher accuracy, multilevel image data into bilevel image data by the improved error diffusion process.

In the second embodiment, the corrected input color value I'' may be determined according to the following, generalized expression:

$$I'' = I + c \times E + d$$

where c, d are predetermined values, respectively.

FIG. 6 shows diagrammatically shows the operation of the second embodiment having the same hardware construction as the apparatus of FIG. 1, according to the control program represented by the flow chart of FIG. 5.

Figure 7:
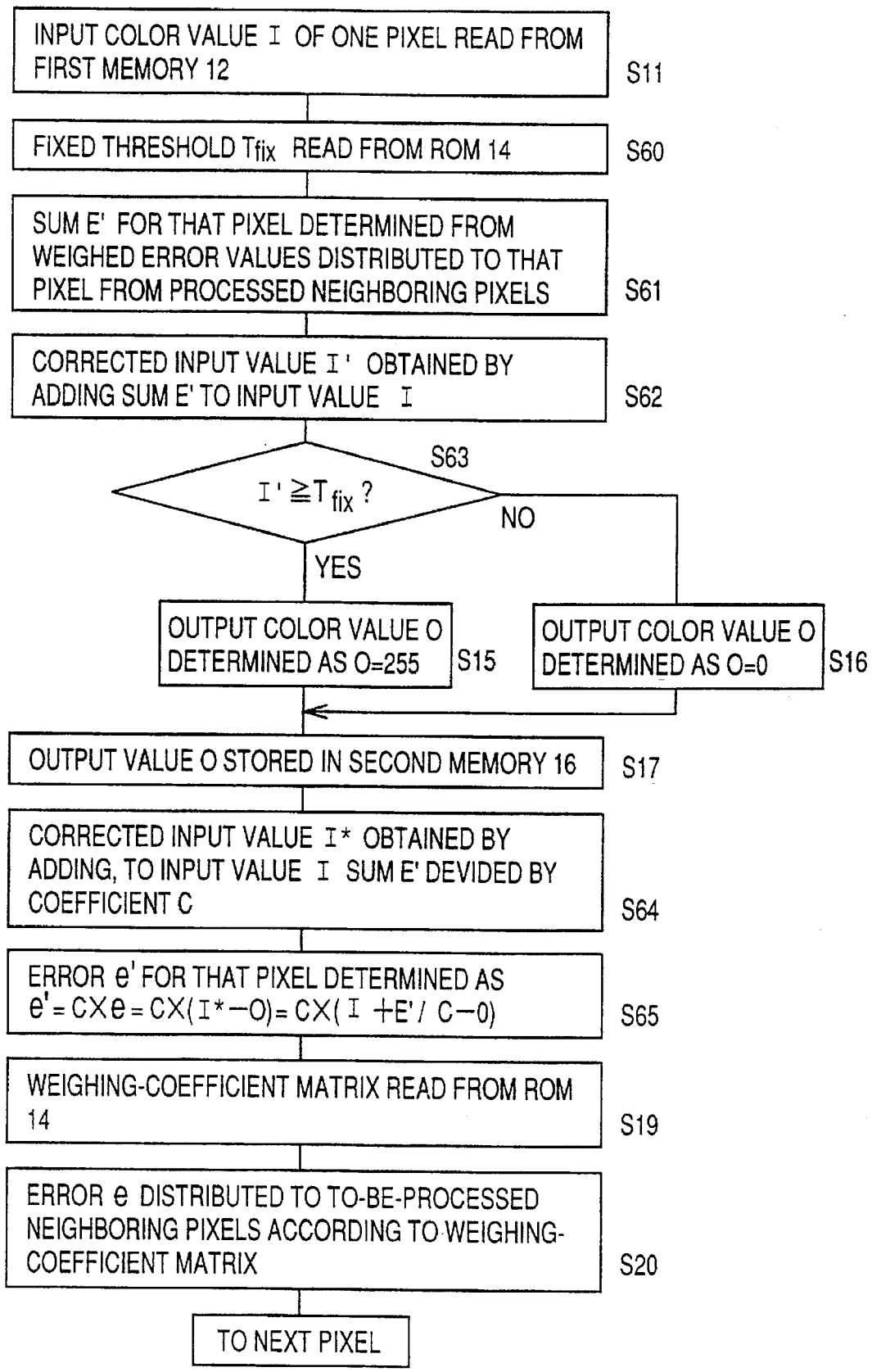
FIG. 7 is a flow chart representing yet another control program according to which the apparatus of FIG. 1 operates for processing multilevel image data into bilevel image data.
Figure 8:
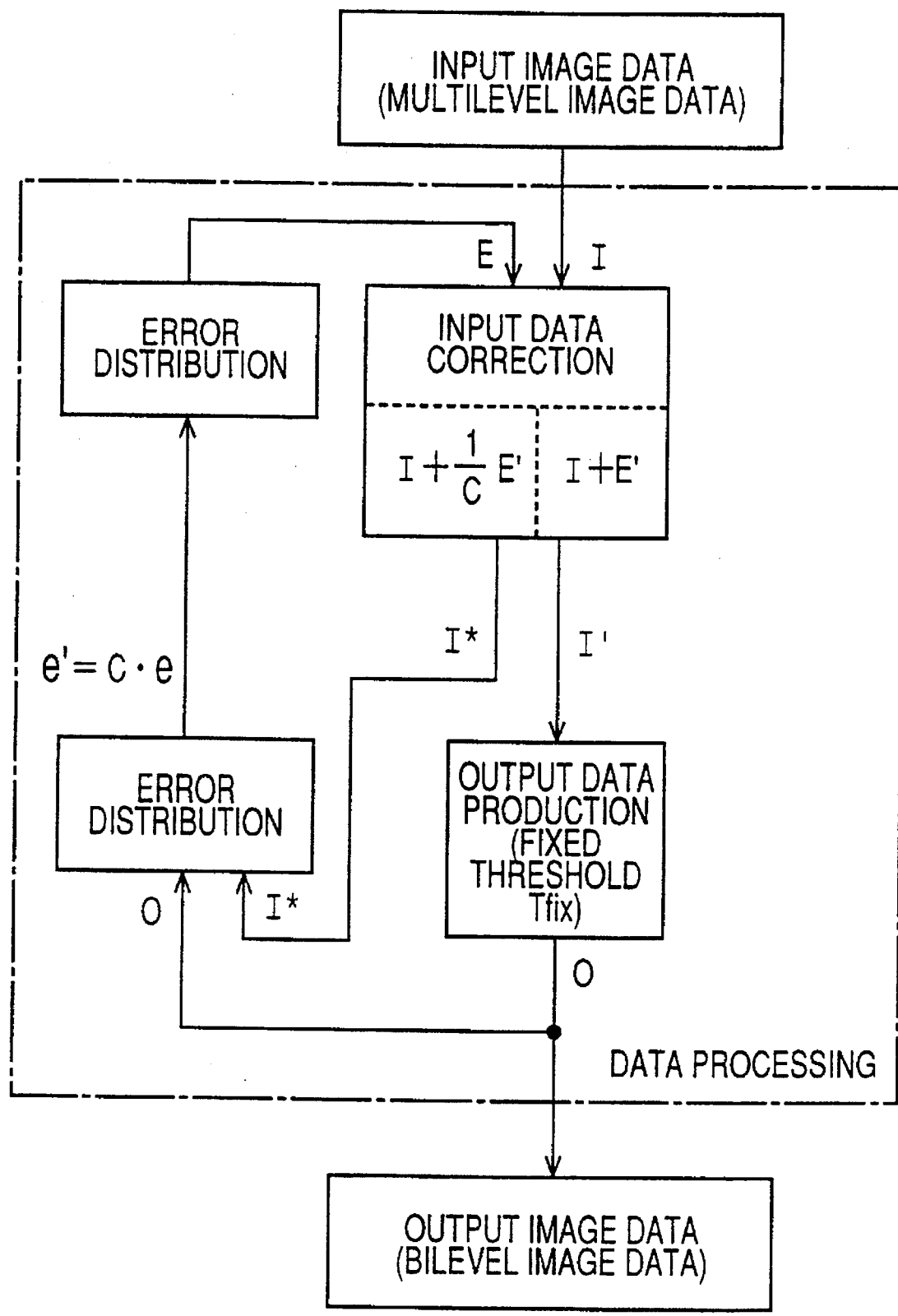
FIG. 8 is a diagrammatic view illustrating the operation of the apparatus of FIG. 1 in accordance with the control program represented by the flow chart of FIG. 7.

Referring further to FIGS. 7 and 8, there is illustrated a third embodiment of the present invention. The third embodiment relates to an image-data processing apparatus having a hardware construction similar to the apparatus shown in FIG. 1. However, in the third embodiment, a ROM 14 of the data processing apparatus stores a fixed threshold, $T_{fix}$=128, and a CPU 15 of the processing apparatus operates according to a control program represented by the flow chart of FIG. 8 in place of the control program represented by the flow chart of FIG. 3. The following description relates to only the differences between the second and third embodiments.

The same results as obtained by correcting the sum E to the input-color-value correction value, B×E, in the expression (6) are obtained by correcting, at Step S65, an error value, e, occurring in processing each set of multilevel pixel data into a corresponding set of bilevel pixel data, to a corrected error value, $e'=C\times e=C\times(I^* -O)$. The corrected error value e' is divided and distributed according to, e.g., a matrix shown in FIG. 2. A corrected first color value, I*, is obtained, at Step S64, by correcting an input color value, I, of each pixel by adding, to the value I, a value, E'/C, obtained by dividing, with a coefficient, C, an sum, E', of respective error values distributed from processed neighboring pixels. In this embodiment, a fixed threshold, $T_{fix}$, is read from the ROM 14 at Step S60; the sum E' for each pixel is read from a RAM 13 at Step S61; a corrected input color value, I' (=I+E'), is determined at Step S62; and the corrected first value I' is compared with the fixed threshold $T_{fix}$ at Step S63.

In the second embodiment, the CPU 15 determines the error value, e', according to the following expression (7):

$$e'=c\times(I+E'/C-O) \quad (7)$$

where I is the input color value of each set of multilevel pixel data,

O is the output color value of a corresponding one set of bilevel pixel data,

E' is the sum of the respective error values distributed from the processed neighboring pixels, and C is an arbitrary coefficient greater than one.

In the case where a coefficient C=2 is used, the same results as obtained in the case where the expression (5) is used are obtained.

In the third embodiment, the CPU 15 determines the error value e' by using the first-color-value correction value, E'/C, having an absolute value smaller than the absolute value of the sum, E', of the respective error values distributed to each pixel of the original half-tone image from processed neighboring pixels corresponding to sets of multilevel pixel data which have been processed by the data processing device 13, 14, 15.

In the third embodiment, the error value e' may be determined according to the following, generalized expression:

$$e'=f\times(I+(E'-g)/f-O)+g$$

where f, g are predetermined values, respectively.

FIG. 8 shows diagrammatically shows the operation of the third embodiment having the same hardware construction as the apparatus of FIG. 1, according to the control program represented by the flow chart of FIG. 8.

While the present invention has been illustrated in its preferred embodiments, the present invention may otherwise be embodied.

Figure 10:
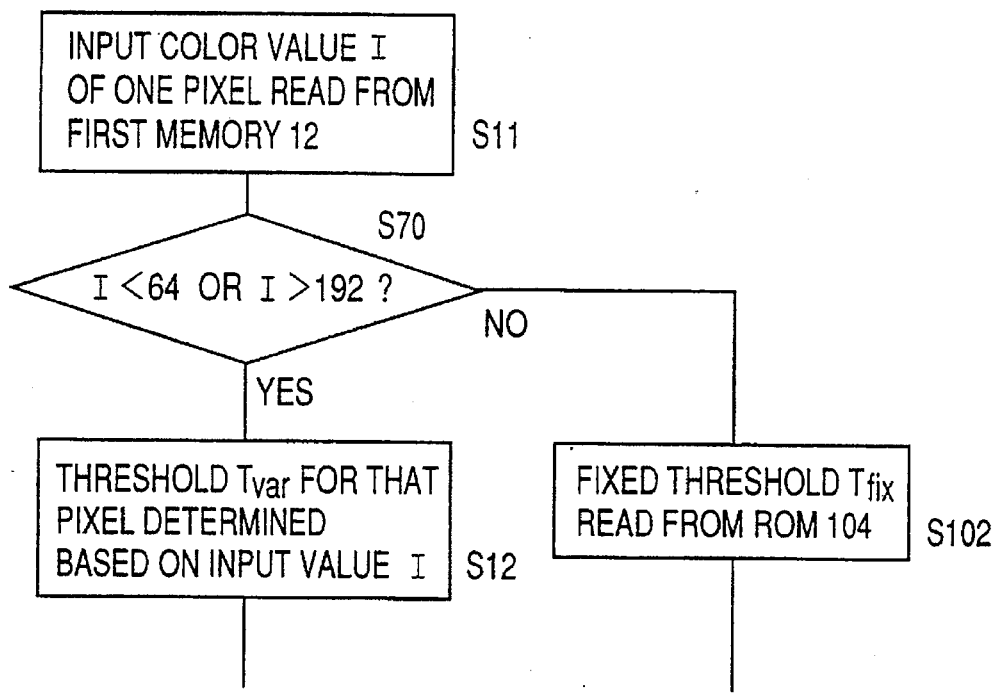
FIG. 10 is a flow chart representing a modified one of the control program represented by the flow chart of FIG. 3.
Figure 14:
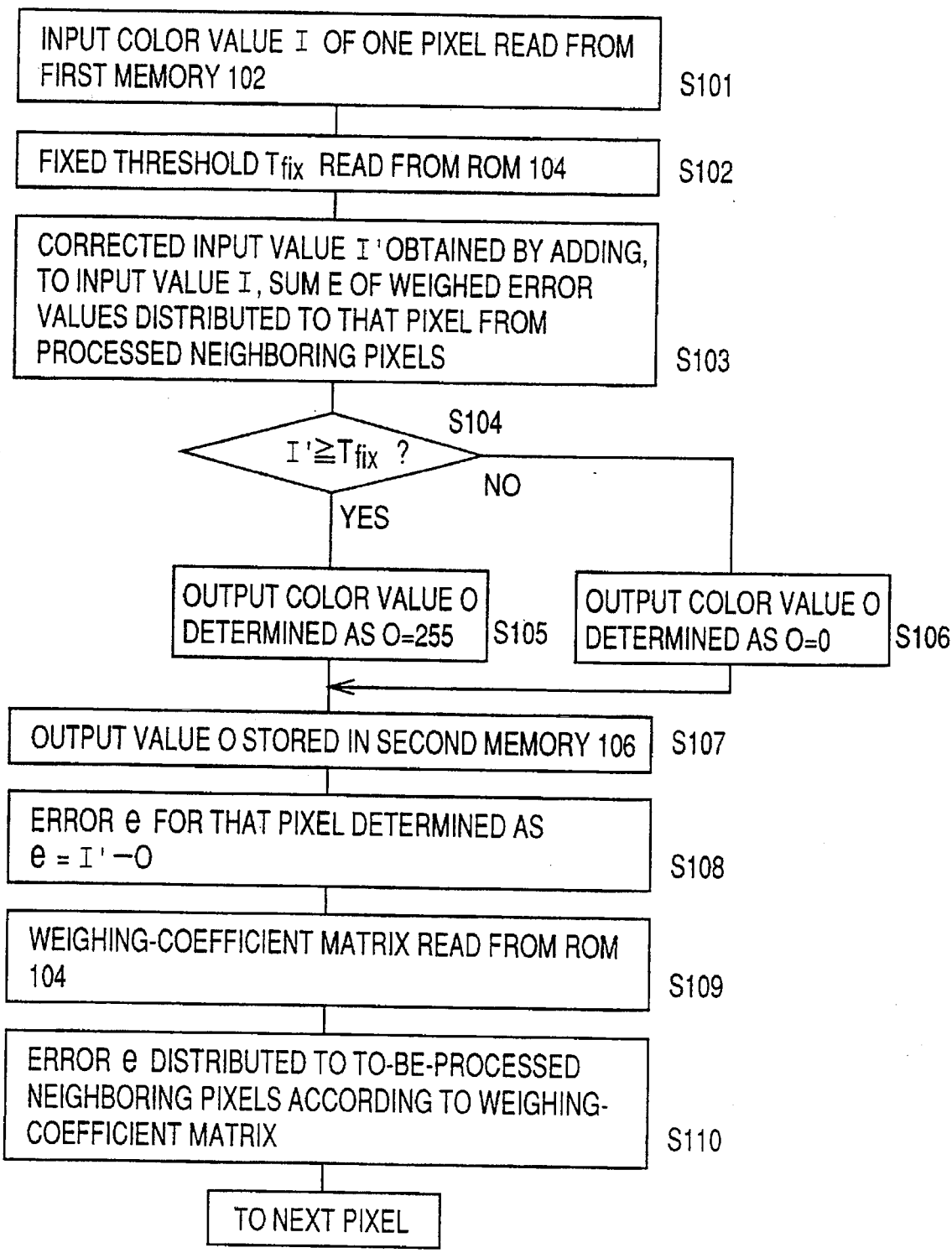
FIG. 14 is a flow chart representing a control program according to which the prior art apparatus of FIG. 13 operates for processing multilevel image data into bilevel image data.

In the first embodiment, the variable threshold $T_{var}$ is determined according to the expression (1), depending upon the input color value I, irrespective of the magnitude of the input value I. However, the biasing of outputting of the pixels as shown in FIG. 15 is observed in particular at the edge or edges where the input color values I largely change. Therefore, the variable threshold $T_{var}$ may be determined according to the expression (1), only when the input color value I falls within a high and a low range of the 0 to 255 input values, and a fixed threshold $T_{fix}$ (e.g., median value, n/2, where the parameter I can take each of n values) may be used when the input value I falls within an intermediate range of the 0 to 255 input values. For example, as shown in FIG. 10, when the input value I is judged to be smaller than 64 or greater than 192, at Step S70, the variable threshold $T_{var}$ is determined according to the expression (2); and when the parameter I is judged to fall within the 64 to 192 input-color-value range, the fixed threshold $T_{fix}=n/2$ (=128) is used like in the conventional error diffusion process represented by the flow chart of FIG. 14.

Figure 11:
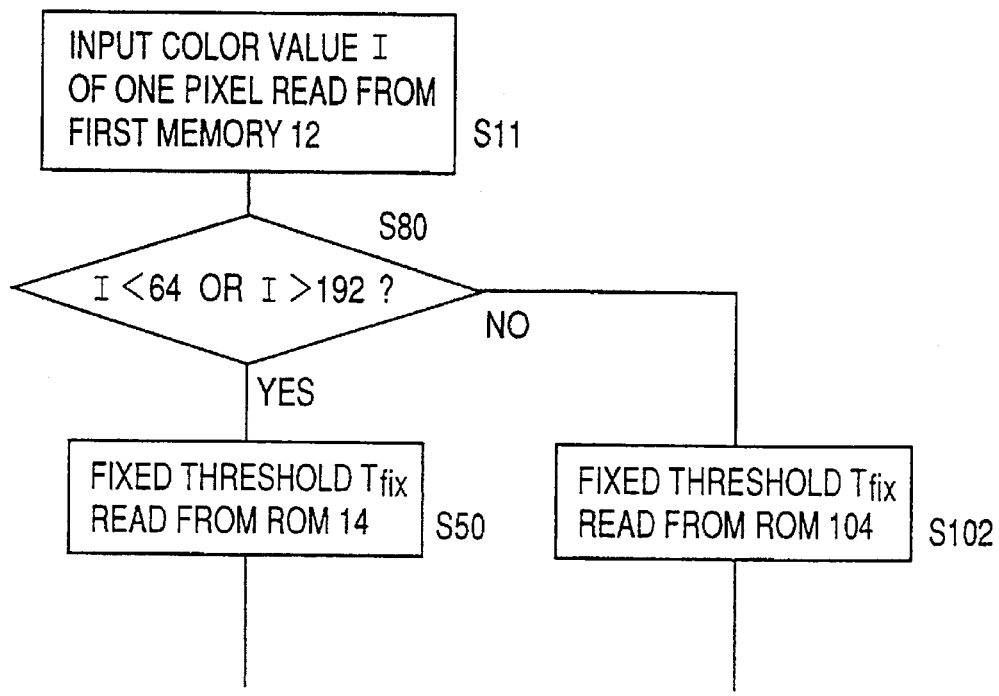
FIG. 11 is a flow chart representing a modified one of the control program represented by the flow chart of FIG. 5.

The same modification as described above may apply to the second embodiment. As shown in FIG. 11, when the input value I is judged to be smaller than 64 or greater than 192, at Step S80, the corrected first input value I" is determined according to the expression (6); and when the parameter I is judged to fall within the 64 to 192 input-color-value range, a different corrected first input value I' (=I+E) is used like in the conventional error diffusion.

Figure 12:
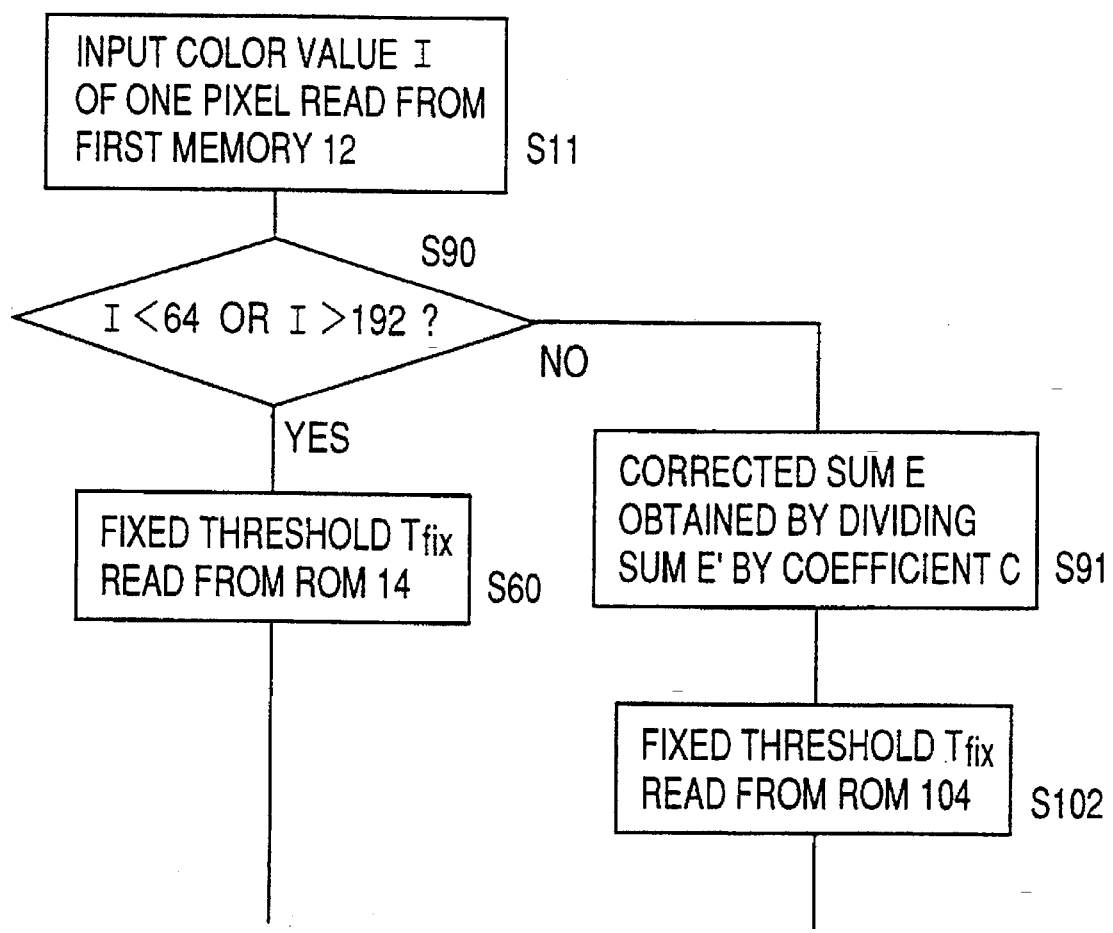
FIG. 12 is a flow chart representing a modified one of the control program represented by the flow chart of FIG. 7.
Figure 13:
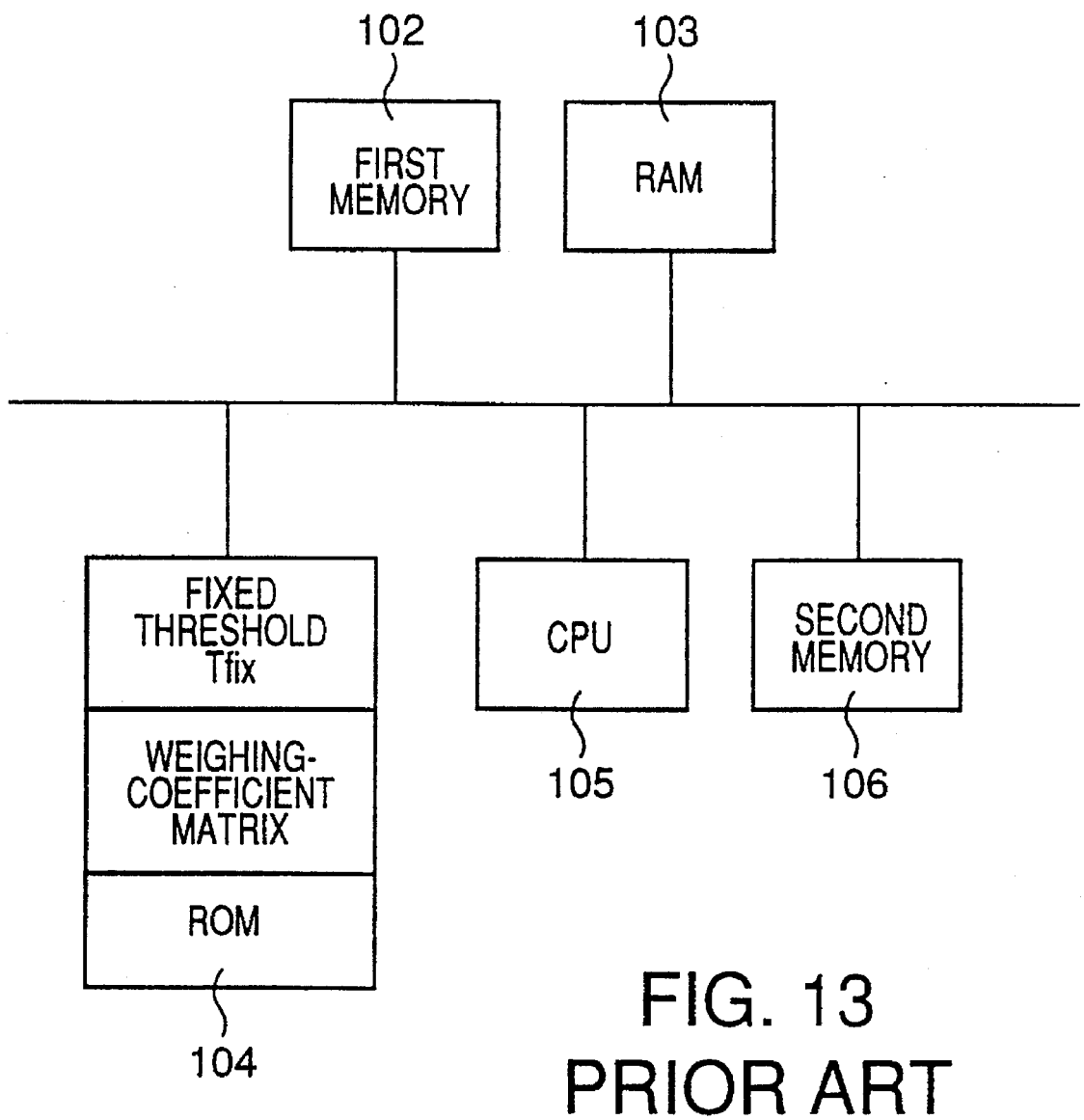
FIG. 13 is a block diagram of a conventional image-data processing apparatus.

The third embodiment may be modified as described above. As shown in FIG. 12, when the input value I is judged to be smaller than 64 or greater than 192, at Step S90, the error value e' is determined according to the expression (7); and when the parameter I is judged to fall within the 64 to 192 input-color-value range, a different corrected input value I' (=I+E'/C, or, I+(E'-g)/f) is used like in the conventional error diffusion process.

In the third embodiment, a different error value, e (=I+ E'/C-O), may be determined and distributed in place of the error value e'. In the latter case, a different weighing-coefficient matrix wherein the sum of the individual weighing coefficients thereof is equal to the coefficient C may be used in place of the matrix of FIG. 2.

It is to be understood that the present invention may be embodied with other changes, improvements, and modifications that may occur to those skilled in the art without departing from the scope and spirit of the invention defined in the appended claims.

What is claimed is:

1. An image-data processing apparatus for processing multilevel image data representing a half-tone image, into bilevel image data representing a bilevel image corresponding to the half-tone image, the multilevel image data comprising a number of sets of multilevel pixel data each set of which represents one of more than two color values as a first color value indicating a color of a corresponding one of a number of pixels of the half-tone image, and is processed into a corresponding one of a number of sets of bilevel pixel data of the bilevel image data so that said corresponding one set of bilevel pixel data represents one of two color values as a second color value indicating a color of a corresponding one of a number of pixels of the bilevel image, the apparatus comprising:

data obtaining means for obtaining said multilevel image data; and data processing means for processing said each set of multilevel pixel data into said corresponding one set of bilevel pixel data, by an error diffusion process wherein an error value occurring in processing said each set of multilevel pixel data into said corresponding one set of bilevel pixel data is distributed to at least one first pixel which neighbors said corresponding one pixel of the half-tone image and corresponds to at least one set of multilevel pixel data yet to be processed by said data processing means, said data processing means processing said each set of multilevel pixel data into said corresponding one set of bilevel pixel data, by employing a threshold value which is variable depending upon said each set of multilevel pixel data, wherein said data processing means comprises threshold determining means for determining said variable threshold value based on said each set of multilevel pixel data, and wherein said threshold determining means comprises means for determining said variable threshold value, $T_{var}$, according to a following expression:

$$T_{var} = a \times I + b$$

where I is said first color value of said each set of multilevel pixel data, and a and b are predetermined values, respectively.

2. An image-data processing apparatus for processing multilevel image data representing a half-tone image, into bilevel image data representing a bilevel image corresponding to the half-tone image, the multilevel image data comprising a number of sets of multilevel pixel data each set of which represents one of more than two color values as a first color value indicating a color of a corresponding one of a number of pixels of the half-tone image, and is processed into a corresponding one of a number of sets of bilevel pixel data of the bilevel image data so that said corresponding one set of bilevel pixel data represents one of two color values as a second color value indicating a color of a corresponding one of a number of pixels of the bilevel image, the apparatus comprising:

data obtaining means for obtaining said multilevel image data; and data processing means for processing said each set of multilevel pixel data into said corresponding one set of bilevel pixel data, by an error diffusion process wherein an error value occurring in processing said each set of multilevel pixel data into said corresponding one set of bilevel pixel data is distributed to at least one first pixel which neighbors said corresponding one pixel of the half-tone image and corresponds to at least one set of multilevel pixel data yet to be processed by said data processing means, said data processing means processing said each set of multilevel pixel data into said corresponding one set of bilevel pixel data, by employing a threshold value which is variable depending upon said each set of multilevel pixel data, wherein said data processing means comprises threshold determining means for determining said variable threshold value based on said each set of multilevel pixel data, and wherein said threshold determining means comprises means for determining said threshold value, $T_{var}$, according to a following expression:

$$T_{var} = n/2 + (I - n/2) \times A$$

where I is said first color value of said each set of multilevel pixel data, n is a number of said more than two color values, and A is an arbitrary coefficient satisfying $0 < A \leq 1$.

3. An image-data processing apparatus for processing multilevel image data representing a half-tone image, into bilevel image data representing a bilevel image corresponding to the half-tone image, the multilevel image data comprising a number of sets of multilevel pixel data each set of which represents one of more than two color values as a first color value indicating a color of a corresponding one of a number of pixels of the half-tone image, and is processed into a corresponding one of a number of sets of bilevel pixel data of the bilevel image data so that said corresponding one set of bilevel pixel data represents one of two color values as a second color value indicating a color of a corresponding one of a number of pixels of the bilevel image, the apparatus comprising:

data obtaining means for obtaining said multilevel image data; and data processing means for processing said each set of multilevel pixel data into said corresponding one set of bilevel pixel data, by an error diffusion process wherein an error value occurring in processing said each set of multilevel pixel data into said corresponding one set of bilevel pixel data is distributed to at least one first pixel which neighbors said corresponding one pixel of the half-tone image and corresponds to at least one set of multilevel pixel data yet to be processed by said data processing means, said data processing means processing said each set of multilevel pixel data into said corresponding one set of bilevel pixel data, by employing a threshold value which is variable depending upon said each set of multilevel pixel data, wherein said data processing means comprises threshold determining means for determining said variable threshold value base don said each set of multilevel pixel data, and wherein said threshold determining means comprises means for determining said threshold value, $T_{var}$, according to a following expression:

$$T_{var} = n/2 + (I - n/2) \times \tfrac{1}{2}$$

wherein I is said first color of each set of multilevel pixel data, and n is a number of said more than two color values.

4. An image-data processing apparatus for processing multilevel image data representing a half-tone image, into bilevel image data representing a bilevel image corresponding to the half-tone image, the multilevel image data comprising a number of sets of multilevel pixel data each set of which represents one of more than two color values as a first color value indicating a color of a corresponding one of a number of pixels of the half-tone image, and is processed into a corresponding one of a number of sets of bilevel pixel data of the bilevel image data so that said corresponding one set of bilevel pixel data represents one of two color values as a second color value indicating a color of a corresponding one of a number of pixels of the bilevel image, the apparatus comprising:

data obtaining means for obtaining said multilevel image data; and data processing means for processing said each set of multilevel pixel data into said corresponding one set of bilevel pixel data, by an error diffusion process wherein an error value occurring in processing said each set of multilevel pixel data into said corresponding one set of bilevel pixel data is distributed to at least one first pixel which neighbors said corresponding one pixel of the half-tone image and corresponds to at least one set of multilevel pixel data yet to be processed by said data processing means, said data processing means processing said each set of multilevel pixel data into said corresponding one set of bilevel pixel data, by employing a threshold value which is variable depending upon said each set of multilevel pixel data, wherein said data processing means comprises means for employing said variable threshold value when said first color value falls within a first range of said more than two color values, and employing, in place of said variable threshold value, a predetermined threshold value when said first color value falls within a second range of said more than two color values which does not overlap said first range.

5. An image-data processing apparatus according to claim 4, further comprising an output device which presents said bilevel image to an observer corresponding to said bilevel image data produced by said data processing means.

6. An image-data processing apparatus according to claim 5, wherein said output device comprises a recorder which records, on a recording medium, said bilevel image represented by said bilevel image data.

7. An image-data processing apparatus according to claim 5, wherein said output device comprises a display which includes an image screen and displays, on said screen, said bilevel image represented by said bilevel image data.

8. An image-data processing apparatus according to claim 4, wherein said data obtaining means comprises an image pick-up device which picks up an original image from an original and produces said multilevel image data representing said original image as said half-tone image.

9. An image-data processing apparatus according to claim 4, wherein said data obtaining means comprises a receiving device which receives said multilevel image data from an external data storage device.

10. An image-data processing apparatus according to claim 4, further comprising an internal data storage device in which said multilevel image data are stored, said data obtaining means comprising means for reading said multilevel image data from said internal data storage device.

11. An image-data processing apparatus according to claim 4, further comprising a data storage device which stores said bilevel image data produced by said data processing means.

12. An image-data processing apparatus according to claim 4, wherein said data processing means comprises:

correcting means for correcting said first color value of said each set of multilevel pixel data, based on a sum of the respective error values distributed by said data processing means to said corresponding one pixel of the half-tone image from a plurality of second pixels which neighbor said corresponding one pixel of the half-tone image and correspond to a plurality of sets of multilevel pixel data which have been processed by the data processing means; and producing means for producing said corresponding one set of bilevel pixel data representing said one of said two color values as said second color value, by comparing the corrected first color value with said variable threshold value.

13. An image-data processing apparatus according to claim 12, wherein said correcting means comprises means for correcting said first color value by adding said sum thereto.

14. An image-data processing apparatus according to claim 12, wherein said data processing means comprises error determining means for determining said error value based on said corrected first color value and said second color value.

15. An image-data processing apparatus according to claim 14, wherein said error determining means comprises means for determining said error value by subtracting said second color value from said corrected first color value.

16. An image-data processing apparatus according to claim 4, wherein said data processing means comprises error distributing means for distributing said error value to a plurality of said first neighboring pixels.

17. An image-data processing apparatus according to claim 16, wherein said error distributing means comprises means for dividing said error value into a plurality of weighed values according to a predetermined weighing rule and distributing said weighed values to said first neighboring pixels, respectively.

18. An image-data processing apparatus according to claim 4, wherein said data processing means comprises threshold determining means for determining said variable threshold value based on said each set of multilevel pixel data.

19. An image-data processing apparatus according to claim 18, wherein said threshold determining means comprises means for determining said variable threshold value, $T_{var}$, according to a following expression:

$$T_{var} = a \times I + b$$

where I is said first color value of said each set of multilevel pixel data, and a and b are predetermined values, respectively.

20. An image-data processing apparatus according to claim 18, wherein said threshold determining means comprises means for determining said threshold value, $T_{var}$, according to a following expression:

$$T_{var} = n/2 + (I - n/2) \times A$$

where I is said first color value of said each set of multilevel pixel data, n is a number of said more than two color values, and A is an arbitrary coefficient satisfying $0 < A \leq 1$.

21. An image-data processing apparatus according to claim 18, wherein said threshold determining means comprises means for determining said threshold value, $T_{var}$, according to a following expression:

$$T_{var} = n/2 + (I - n/2) \times \frac{1}{2}$$

where I is said first color value of said each set of multilevel pixel data, and n is a number of said more than two color values.

22. An image-data processing apparatus for processing multilevel image data representing a half-tone image, into bilevel image data representing a bilevel image corresponding to the half-tone image, the multilevel image data comprising a number of sets of multilevel pixel data each set of which represents one of more than two color values as a first color value indicating a color of a corresponding one of a number of pixels of the half-tone image, and is processed into a corresponding one of a number of sets of bilevel pixel data of the bilevel image data so that said corresponding one set of bilevel pixel data represents one of two color values as a second color value indicating a color of a corresponding one of a number of pixels of the bilevel image, the apparatus comprising:

data obtaining means for obtaining said multilevel image data; and data processing means for processing said each set of multilevel pixel data into said corresponding one set of bilevel pixel data, by an error diffusion process wherein an error value occurring in processing said each set of multilevel pixel data into said corresponding one set of bilevel pixel data is distributed to at least one first pixel which neighbors said corresponding one pixel of the half-tone image and corresponds to at least one set of multilevel pixel data yet to be processed by said data processing means, said data processing means processing, according to a predetermined rule, said each set of multilevel pixel data into said corresponding one set of bilevel pixel data, by using a first-color-value correction value having an absolute value greater than an absolute value of a sum of at least one error value distributed thereby to said corresponding one pixel of the half-tone image from at least one second pixel which neighbors said corresponding one pixel of the half-tone image and which corresponds to at least one set of multilevel pixel data which has been processed by the data processing means.

23. An image-data processing apparatus according to claim 22, further comprising an output device which presents said bilevel image to an observer corresponding to said bilevel image data produced by said data processing means.

24. An image-data processing apparatus according to claim 22, wherein said data obtaining means comprises an image pick-up device which picks up an original image from an original and produces said multilevel image data representing said original image as said half-tone image.

25. An image-data processing apparatus according to claim 22, wherein said data processing means comprises:

correcting means for correcting said first color value of said each set of multilevel pixel data, based on said correction value; and producing means for producing said corresponding one set of bilevel pixel data representing said one of said two color values as said second color value, by comparing the corrected first color value with a predetermined threshold value.

26. An image-data processing apparatus according to claim 25, wherein said correcting means comprises means for correcting said first color value by adding said correction value thereto.

27. An image-data processing apparatus according to claim 26, wherein said correcting means comprises means for correcting said first color value into said corrected first color value, I", according to a following expression:

$$I''=I+a\times E+b$$

where I is said first color value of said each set of multilevel pixel data,

E is said sum of the respective error values distributed from a plurality of said second neighboring pixels, and a, b are predetermined values, respectively.

28. An image-data processing apparatus according to claim 26, wherein said correcting means comprises means for correcting said first color value into said corrected first color value, I", according to a following expression:

$$I''=I+B\times E$$

where I is said first color value of said each set of multilevel pixel data,

E is said sum of the respective error values distributed from a plurality of said second neighboring pixels, and B is an arbitrary coefficient greater than one.

29. An image-data processing apparatus according to claim 26, wherein said correcting means comprises means for correcting said first color value into said corrected first color value, I", according to a following expression:

$$I''=I+2\times E$$

where I is said first color value of said each set of multilevel pixel data, and is said sum of the respective error values distributed from a plurality of said second neighboring pixels.

30. An image-data processing apparatus according to claim 22, wherein said data processing means comprises error determining means for determining said error value based on said first color value, said sum, and said second color value.

31. An image-data processing apparatus according to claim 30, wherein said error determining means comprises means for determining said error value by subtracting said second color value from said first color value added with said sum.

32. An image-data processing apparatus according to claim 22, wherein said data processing means comprises error distributing means for distributing said error value to a plurality of said first neighboring pixels.

33. An image-data processing apparatus according to claim 32, wherein said error distributing means comprises means for dividing said error value into a plurality of weighed values according to a predetermined weighing rule and distributing said weighed values to said first neighboring pixels, respectively.

34. An image-data processing apparatus according to claim 22, wherein said data processing means comprises means for using said correction value when said first color value falls within a first range of said more than two color values, and using, in place of said correction value, said sum of the respective error values distributed from a plurality of said second neighboring pixels, when said first color value falls within a second range of said more than two color values which does not overlap said first range.

35. An image-data processing apparatus for processing multilevel image data representing a half-tone image, into bilevel image data representing a bilevel image corresponding to the half-tone image, the multilevel image data comprising a number of sets of multilevel pixel data each set of which represents one of more than two color values as a first color value indicating a color of a corresponding one of a number of pixels of the half-tone image, and is processed into a corresponding one of a number of sets of bilevel pixel data of the bilevel image data so that said corresponding one set of bilevel pixel data represents one of two color values as a second color value indicating a color of a corresponding one of a number of pixels of the bilevel image, the apparatus comprising:

data obtaining means for obtaining said multilevel image data; and data processing means for processing said each set of multilevel pixel data into said corresponding one set of bilevel pixel data, by an error diffusion process wherein an error value occurring in processing said each set of multilevel pixel data into said corresponding one set of bilevel pixel data is distributed to at least one first pixel which neighbors said corresponding one pixel of the half-tone image and corresponds to at least one set of multilevel pixel data yet to be processed by said data processing means, said data processing means determining, according to a predetermined rule, said error value by using a first-color-value correction value having an absolute value smaller than an absolute value of a sum of at least one error value distributed thereby to said corresponding one pixel of the half-tone image from at least one second pixel which neighbors said corresponding one pixel of the half-tone image and which corresponds to at least one set of multilevel pixel data which has been processed by the data processing means.

36. An image-data processing apparatus according to claim 35, wherein said data processing means comprises error determining means for determining said error value, e', according to a following expression:

$$e' = c \times (I + E'/C - O)$$

where I is said first color value of said each set of multilevel pixel data,
O is said second color value of said corresponding one set of bilevel pixel data,
E' is said sum of the respective error values distributed from a plurality of said second neighboring pixels, and
C is an arbitrary coefficient greater than one.

37. An image-data processing apparatus according to claim 35, wherein said data processing means comprises error determining means for determining said error value, e', according to a following expression:

$$e' = 2 \times (I + E'/2 - O)$$

where I is said first color value of said each set of multilevel pixel data,
O is said second color value of said corresponding one set of bilevel pixel data, and
E' is said sum of the respective error values distributed from a plurality of said second neighboring pixels.

38. An image-data processing apparatus according to claim 35, wherein said data processing means comprises error distributing means for dividing said error value into a plurality of weighed values according to a predetermined weighing rule and distributing said weighed values to a plurality of said first neighboring pixels, respectively.

39. An image-data processing apparatus according to claim 35, wherein said data processing means comprises:
correcting means for correcting said first color value of said each set of multilevel pixel data, based on said sum of the respective error values distributed from a plurality of said second neighboring pixels; and
data producing means for producing said corresponding one set of bilevel pixel data representing said one of said two color values as said second color value, by comparing the corrected first color value with a predetermined threshold value.

40. An image-data processing apparatus according to claim 39, wherein said correcting means comprises means for using said sum when said first color value falls within a first range of said more than two color values, and using, in place of said sum, said correction value when said first color value falls within a second range of said more than two color values which does not overlap said first range.

41. An image-data processing apparatus according to claim 35, further comprising an output device which presents said bilevel image to an observer corresponding to said bilevel image data produced by said data processing means.

42. An image-data processing apparatus according to claim 35, wherein said data obtaining means comprises an image pick-up device which picks up an original image from an original and produces said multilevel image data representing said original image as said half-tone image.

* * * * *